(12) United States Patent
Okunaga et al.

(10) Patent No.: US 6,490,123 B1
(45) Date of Patent: *Dec. 3, 2002

(54) DISC DRIVE HAVING 3.5 INCH FORM FACTOR HOUSING AND 2.5 INCH FORM FACTOR DISK MEDIA

(75) Inventors: Nobuyuki Okunaga, Odawara (JP); Masao Iwakura, Odawara (JP); Kazuo Nakagoshi, Odawara (JP); Takuji Ogawa, Odawara (JP); Chuma Akira, Ashigarashimo-gun (JP); Fumio Kugiya, Odawara (JP); Tomio Suzuki, Hiratsuka (JP); Toshiaki Kojima, Odawara (JP); Kazuo Sakai, Niihari-gun (JP); Naoki Kodama, Kamakura (JP); Tatsuya Ishigaki, Yokohama (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,969

(22) Filed: Nov. 5, 1998

(30) Foreign Application Priority Data

Nov. 7, 1997 (JP) ............................................. 9-306064
Jun. 5, 1998 (JP) ........................................... 10-157145

(51) Int. Cl.$^7$ .............................................. G11B 25/00
(52) U.S. Cl. .................................................. 360/97.01
(58) Field of Search .......................... 360/97.01, 97.02, 360/106; 361/684, 685, 687, 688, 695

(56) References Cited

U.S. PATENT DOCUMENTS

| | | | | |
|---|---|---|---|---|
| 4,339,777 A | * | 7/1982 | Gruczelak | ................ 360/97.02 |
| 4,568,988 A | * | 2/1986 | McGinlay et al. | ............ 360/77 |
| 4,642,715 A | * | 2/1987 | Ende | ........................ 360/97.02 |
| 5,034,837 A | * | 7/1991 | Schmitz | ...................... 360/105 |
| 5,195,002 A | * | 3/1993 | Sakurai | .................... 360/99.08 |
| 5,218,514 A | * | 6/1993 | Huynh et al. | ................ 361/683 |
| H1221 H | * | 8/1993 | Best et al. | ................ 360/97.01 |
| 5,243,479 A | | 9/1993 | Nakagoshi et al. | ....... 360/98.01 |
| 5,247,410 A | * | 9/1993 | Ebihara et al. | ............. 360/106 |

(List continued on next page.)

FOREIGN PATENT DOCUMENTS

| EP | 564 119 | 10/1993 |
|---|---|---|
| EP | 671 741 | 9/1995 |
| JP | 4-205776 | 7/1992 |
| JP | 63-104282 | 5/1999 |

OTHER PUBLICATIONS

"Redundant Disk Array in 3.5 Inch Form Factor," IBM Technical Disclosure Bulletin, vol. 37, No. 12, Dec. 1, 1994, pp. 525–527.

Publication entitled "Magnetic Hard Disk Drive Form Factor Evolution", Aug. 1993, pp. 521–526, by Grochowski et al.*

*Primary Examiner*—Brian E. Miller
(74) *Attorney, Agent, or Firm*—Mattingly, Stanger & Malur, P.C.

(57) ABSTRACT

A magnetic disk drive has a housing for a 3.5 inch form factor and disk media of a diameter for a 2.5 inch form factor. The smaller disk media rotate at a high speed while consuming low electric lower and generating less heat while providing for quick access speeds. Usually, when the magnetic disk media are rotated at a higher speed, the electric power consumption and heat generation are increased because of the load increase. This problem is avoided with the use of cooling fins placed about the periphery of the disk media. Further, the smaller size disk media enable a decrease in torque loss during on-load rotation with the media, and a decrease of electric current to the spindle motor during rotation.

4 Claims, 18 Drawing Sheets

U.S. PATENT DOCUMENTS

| | | | | |
|---|---|---|---|---|
| 5,367,416 A | * | 11/1994 | Cossette et al. | 360/97.02 |
| 5,414,591 A | * | 5/1995 | Kimura et al. | 361/695 |
| 5,454,157 A | * | 10/1995 | Ananth et al. | 360/97.03 |
| 5,506,458 A | * | 4/1996 | Pace et al. | 310/67 R |
| 5,627,702 A | * | 5/1997 | Kelemen et al. | 360/106 |
| 5,689,386 A | * | 11/1997 | Morehouse et al. | 360/97.02 |
| 5,709,263 A | * | 1/1998 | Mira | 165/80.3 |
| 5,731,932 A | * | 3/1998 | Crane | 360/104 |
| 5,808,830 A | * | 9/1998 | Stefansky et al. | 360/97.01 |
| 5,850,318 A | * | 12/1998 | Dunfield et al. | 360/99.08 |
| 5,870,247 A | * | 2/1999 | Schirle | 360/97.02 |
| 5,898,545 A | * | 4/1999 | Schirle | 360/105 |
| 5,940,247 A | * | 8/1999 | Karis et al. | 360/99.08 |
| 5,986,852 A | * | 11/1999 | Berg et al. | 360/104 |
| 6,040,957 A | * | 3/2000 | Konings | 360/98.08 |

* cited by examiner

DISC DRIVE HAVING 3.5 INCH FORM FACTOR HOUSING AND 2.5 INCH FORM FACTOR DISK MEDIA

BACKGROUND OF THE INVENTION

1. Field of the Invention

A present invention relates to a magnetic disk drive, particularly, rotating a magnetic disk medium in a high speed and a magnetic disk drive system using this technique.

2. Description of the Related Art

In a magnetic disk drive system that is used as a high precision external storage, for example, a computer, a file server or a disk array, it is well known that a magnetic head flies a given distance over a recording surface of a magnetic disk medium in the magnetic disk drive system, so that information is recorded on or reproduced from the magnetic disk medium via a magnetic flux.

Performance of magnetic disk drives greatly affects the throughput of the magnetic disk drive system. For better performance, there are typically the following improvements of the system.

1) a memory capacity improvement within a limited system hardware (Increase of an information storage capacity per unit volume)
2) retrenchment of time for moving a magnetic head to a dedicated track on the magnetic disk medium (Shortening of seek time)
3) retrenchment of waiting time in rotation for waiting a magnetic head to a dedicated location at the specified position of a truck of the magnetic disk medium These items were resolved in the present invention by an increase of rotational speed of the magnetic disk media, which also increases an input-output transfer rate of information between magnetic disk drive and upper system, and between magnetic disk drive system and upper system.

There is a "3.5 inches" form factor drive that is well known. Here, "3.5 inches" is called the shape coefficient. "3.5 inches" size means a magnetic disk drive which is about 4 inches (101.6 mm) in width, and about 5.75 inches (146.1 mm) in length. It usually is about 1 inch in height unless otherwise specified.

In case a rectangular parallelepiped circumscribes a magnetic disk drive, let's imagine the largest face that is parallel to the magnetic disk medium. At this time, the largest face of the "3.5 inches" drive can include two largest faces of a "2.5 inches" drive. Similarly, a largest face of the "5 inches" drive can include two largest faces of a "3.5 inches" drive. The shapes that fall in the above relationships are called form factors.

The conventional "3.5 inches" magnetic disk drive has a structure, in a housing with 3.5 inches shape coefficient, which comprises: an arm than supports magnetic head parts, a carriage with the arm, which positions the magnetic head to the specified location on the magnetic disk media, an in-hub-type spindle motor that has rotational mechanism within a hub that holds the magnetic disk media on its outer surface, and magnetic disk media of which most outside diameter is 95 mm stacked on the hub (hereinafter called "3.5 inches" disk for short)

Here, there are "3.5 inches" magnetic disk drives which have mainly about 1 inch (25.4 mm) height or about 1.63 inches (41.4 mm) height.

FIG. 3 shows an inner structure (plan view) of prior "3.5 inches" magnetic disk drive. External size of the housing 13 is a 3.5 inches form factor size (101.6 mm×146 mm). Magnetic disk media 23 are secured by a disk clamp 33 to a spindle motor 43, which are rotated at predetermined speed in this housing.

Magnetic heads 53 are secured to an edge of an actuator (the carriage and a coil) 63. The actuator 63 is secured rotatably by a pivot bearing 73 to the housing. The housing 13 secures a voice coil motor 83 that consists of a magnetic circuit. The coil of the actuator 63 is flowed by electricity, then it generates a rotational torque with electromagnetic force and drives the actuator 63. Consequently, the magnetic head 53 supported at the edge of the actuator executes a seek operation in which the head are located at an artbitrary location on the disk media 23 along a quasi-radial direction.

In the 1.6 inches height magnetic disk drive with an about 41 mm official height, the spindle motor 43 is mounted stackingly with eight "3.5 inches" disk media (0.8 mm thickness). In 1 inch height magnetic disk drive with an about 25.4 mm official height, it is mounted stackingly with four "3.5 inches" disk media.

Other prior arts about faster rotating technique of spindle motors are disclosed, for example, at Japanese Laid opened, sho 63-104282 (corresponding to U.S. Pat. No. 5,243,479) and at Japanese Laid opened, hei 04-205776 that shows stacking structures with "3.5 inches" disk media or "2.5 inches" disk media in a housing of 5.25 inches of shape coefficient.

Inventors of this application tried to rotate magnetic disk media of 1.6 inches height magnetic disk drive shown in FIG. 3 faster than in prior arts. They confirmed that when a rotational speed of spindle motor 43 becomes 10000 rpm from 7200 rpm (prior rotational speed), electric energy consumption increases with about 60 percent and becomes more than 20 watts despite a lightweight design review that decreases the disk media 23 from 10 disks to 8 disks in the stack.

They also confirmed that an inner temperature of the housing 13 becomes more than 80 degree centigrade without cooling means surrounding the 1.6 inches height magnetic disk drive shown in FIG. 3. The cooling means are, for example, a fan that makes air flow for cooling.

Inventors of this application tried to rotate magnetic disk media of 1.6 inches height magnetic disk drive shown in FIG. 12 faster than in prior arts. When a rotational speed of spindle motor 43 becomes 12000 rpm from 6300 rpm (prior rotational speed), electric energy consumption increases with about 460 percent.

Japanese Laid opened, hei 4-205776 shows a magnetic disk drive that mounts a stack of magnetic disk media smaller in outer size than that of "5.25 inches" magnetic disk media within a housing that is designed for a 5.25 inches form factor size magnetic disk drive. But it does not consider an increase of heat generation caused from faster rotation and higher density mounting.

Japanese Laid opened, sho 63-104282 (corresponding to U.S. Pat. No. 5,243,479) does not consider fully a heat radiation while it discloses an increase of rotational speed of magnetic media.

Inventors of this application mounts magnetic disk media for "2.5 inches" form factor magnetic disk drives, in the housing for 1.6 inches height "3.5 inches" magnetic disk drive. And further they rotates the media at 12000 rpm in order to fabricate a magnetic disk drive with a high transfer rate of information (FIG. 13, FIG. 14). Inventors of this application found that it is necessary for keeping the inner temperature equal to or lower than 60 degrees centigrade to mount eight disk media or less when 0.8 mm thickness media are adopted and to mount eleven disk media or less when 0.635 mm thickness media are adopted. That is, they found that it is possible to rotate disk media faster with victimizing the information storage capacity in some extent, and that the storage capacity and the faster rotation of the media are in the trade-off relationship.

Here, disk media for the 2.5 inches form factor magnetic disk drive have a 65±3 mm diameter (outermost diameter) and a 0.8 mm±0.2 mm thickness or a 0.4 mm±0.2 mm thickness. Normal thicknesses of the media are 0.8 mm, 0.635 mm or 0.381 mm.

One of the reasons why the inner temperature of the housing (during a seek operation) is kept in the predetermined temperature or less, for example, 60 degree centigrade or less, is to get a long life of the disk drive by setting an enough margin in temperature for long lives of a lubricant on the disk media surface and a grease in bearings of the spindle motor. Another is not to give a bad influence to a status between the magnetic head and the magnetic disk media, and to a posture of a slider. Consequently, recording or reproducing with a information to or from the disk media are not influenced badly. Thus, temperature specifications of the magnetic disk drive can be guaranteed.

Thus, inventors of this application found that it is necessary for making the stack of media lightweight, for achieving the faster rotational speed of the media, and for keeping or increasing the storage capacity, to attach a special cooling mechanism to the magnetic disk drive.

In the magnetic disk drive system, for example, the file server or the disk array, it is desirable for rotating the magnetic media faster and for keeping the system highly reliable that cooling means should be provided to the magnetic disk drive.

SUMMARY OF THE INVENTION

It is an object of the present invention to provide magnetic disk drives with a big storage capacity and a high reliability, which rotate the magnetic disk media at a high speed and which restrain heat generation grown out of the high speed rotation.

It is other object of the present invention to provide magnetic disk drives and magnetic disk drive systems with a big storage capacity and a high speed accessing ability.

It is other object of the present invention to provide magnetic disk drives and magnetic disk drive systems with a high speed accessing ability and a good cost performance.

Other objects of the present invention may be clear from the statement of this specification and drawings.

Achieving the above objects, the magnetic disk drive of the present invention mounts magnetic disk media smaller in diameter than "3.5 inches" magnetic disk media within a magnetic disk drive in a shape coefficient 3.5 inches. For more cost performance, (in other words, using general-purpose parts that do not come expensive in stead of custom-order parts), the magnetic disk drive of the present invention may mount magnetic disk media for drives in a shape coefficient 2.5 inches, 65 mm media in outer diameter within the magnetic disk drive in the shape coefficient 3.5 inches.

Under the above structure, in the housing that is sealed including the actuator, the spindle motor, etc., around the magnetic disk media of 65 mm in outer diameter, space of 95 mm−65 mm=30 mm arises. If it says in the distance from the center axis of the spindle motor that rotates the magnetic disk media, a clearance of 15 mm arises.

From the trade off relationship between a performance and a price of the magnetic disk drive, members for heat radiation may be arranged in this margin area. Or this radiation member may not be arranged, resulting in that the magnetic disk drive may have a margin for parts' arrangement in the above space.

When the radiation members are arranged, they are composed to arrange fins (uneven parts) in surrounding periphery of the magnetic disk medium.

Distance between the center of the spindle motor that rotates magnetic disk media of 65 mm in outer diameter, and the center of the actuator, may be arranged so that it becomes 40±1 mm or less. Further, if cost performance is pursued, if normal actuator parts are used, and if a torque of the voice coil motor is increased, the above distance can be extended to 47.5 mm. The distance may have a margin considering to a windage loss, etc.

Further, in stead of magnetic disk media of a 65 mm in outer diameter, a magnetic disk media for a magnetic disk drive in a shape coefficient 1.8 inches, may be used in the 3.5 inches magnetic disk drive. The magnetic disk media of 48 mm in outer diameter are normal media for magnetic disk drives in shape coefficient 1.8 inches, and its thickness is 0.381 mm.

DETAILED DESCRIPTION OF THE PREFERRED EMBODIMENTS

Figure 1:
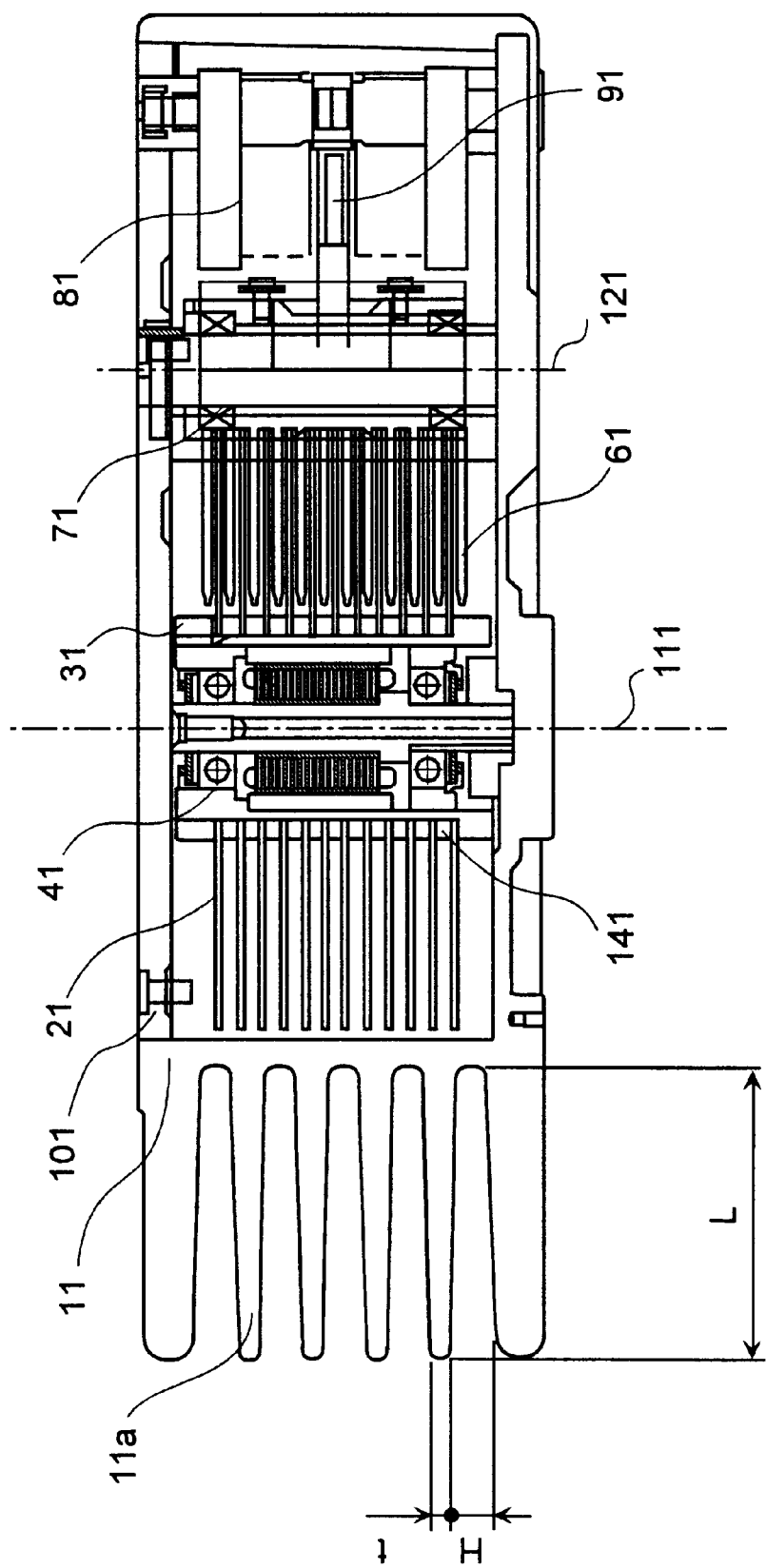
FIG. 1 is a cross-sectional side view of a magnetic disk drive, which shows a first embodiment of the present invention.

FIG. 1 is a cross-sectional view that shows an outline of the internal structure of the magnetic disk drive, first embodiment of the present invention. Housing 11 has a 3.5 inches form factor size with official height of 41.4 mm. "2.5 inches" magnetic disk media 21 (65 mm in diameter, 0.635 mm in thickness), a spindle motor 41 that rotates these media 21 in a predetermined rotational speed, a rotary type actuator 61 that locates the magnetic head around a pivot bearing 71, and a voice coil motor 81 that drives the rotary type actuator 61 are secured in this housing 11.

A securing method of the spindle motor 41 is with a screw or by a press fit to be secured at one edge of or at both edges of the spindle motor 41 to the housing 11 that includes the spindle motor 41, or to the housing 11 and a cover 101 that hermetically closes the inner space of the housing 11. Magnetic disk medium 21 uses Al (aluminum) or glass for its substrate material. For more economic fabrication of the magnetic disk drive, in place of screws and press fits, an adhesive may be used for securing.

Magnetic disk media 21 are stacked via spacers 141, thickness of which is 1.7 mm. The space between the media is 1.7 mm. 12 media are stacked in an axial direction. Magnetic disk media 21 are fixed by a disk clamp 31 to the spindle motor 41 that can rotate to 15000 rpm.

The 111 axis of the rotary center of magnetic disk media 21 is arranged almost at a central portion of the housing 11. The housing 11 that is en bloc casted with aluminum alloy, has linear fins 11a arranged at four portions outside the housing, each of which fins is defined with a thickness at a leaf edge t=2 mm, a leaf length L=32 mm, a distance H between leaf edges is 5 mm, and each of which fins is stood straight against 111 axis of the rotary center of magnetic disk media 21.

As magnetic disk media 21 becomes smaller in diameter, for example, as changing "3.5 inches" disk media to "2.5 inches" disk media in same thickness of 0.8 mm, a weight per one disk medium reduces by about 54%. As changing "3.5 inches" disk media to "2.5 inches" disk media in other thickness of 0.635 mm, a weight per one disk medium reduces by about 64%. Therefore, a gross weight the spindle motor rotates can be reduced, which brings a high characteristic at a spin-up operation, and which also effects a reduction of electric current (electric energy consumption) during an idle rotation.

If magnetic disk media are changed from "3.5 inches" to "2.5 inches", for example, a maximum marginal velocity when the "3.5 inches" disk media rotate at 10000 r.p.m. equals to a maximum marginal velocity when the "2.5 inches" disk media rotate at 14600 r.p.m. Therefore, when recording or reproducing an dedicated information to or from the magnetic disk media 21 by a magnetic head 51 (FIG. 2) via a magnetic flux, if a signal processing ability is same as in the past or more, faster rotation of the media can be executed without a reduction of recording density in longitudinal direction along a track that is located concentrically on the magnetic disk media 21.

When magnetic disk media 21 rotate, they receive a frictional resistance by a viscosity of air that surrounds the magnetic disk media 21. A transition boundary where an air flow along a surface of the magnetic disk media becomes from a laminar flow to a turbulent flow is about 15000 r.p.m. when the magnetic disk media 21 is "3.5 inches" disk and about 30000 r.p.m. when the media is "2.5 inches" disk.

When magnetic disk media 21 are changed from "3.5 inches" to "2.5 inches", the transition boundary is big enough against the number of rotation limits of the spindle motor 41. Because an torque loss during on-load rotation, which is caused from the frictional resistance, becomes bigger biquadrately proportional to a diameter of the magnetic disk media, if the spindle rotates the media in a same speed, the torque loss of "2.5 inches" disk media corresponds to about 22% of that of "3.5 inches" disk media. Therefore, when the spindle motor 41 rotates in a predetermined idle speed, the current (consumption power) becomes smaller, and a heat generation caused by windage can be restrained.

Fins 11a are made at plural portions of the housing 11, which have an effect that increases a surface area of the housing 11 and that makes a heat-penetration flow good. The tips of fins 11a become closer to the temperature of the external air of housing 11. The rotation of spindle motor 41 and the flutter of actuator 61 driven by the system generate a heat, which rises an internal temperature of the magnetic disk drive. The fins 11a reduce this temperature increase.

As for the fins, if the thickness t is 0.5 mm or more, a radiation coefficient almost never changes. If the length L of the fins at four portions is made to be 10 mm or more, the radiation becomes effective. Consequently, the fins can restrain temperature risings at least with about 5 degree centigrade at 10000 r.p.m. rotation, about 8 degree centigrade at 12000 r.p.m. rotation, and about 10 degree centigrade at 15000 r.p.m. rotation. It is advantageous to make the length L of the fins long as much as possible. And it can bring a heat penetration flow good to make the number of the fins big as many as possible, because the surface area of the fins become broader. And if the fins 11a are arranged in a air flow made by a fan that is installed in a case of a magnetic disk drive system on which the magnetic disk drive is mounted, a cooling of the magnetic disk drive become more effective.

a) Power consumption (during the idle rotation) can be restrained as 6.3 watt or less when the spindle rotates at 10000 r.p.m., 8.3 watt or less when it rotates at 12000 r.p.m., and 11.8 watt or less at 15000 r.p.m.

b) The inner temperature of the housing 11 (during the seek operation) can be restrained at 47 degree centigrade or less when the spindle rotates at 10000 r.p.m., at 52 degree centigrade or less when it rotates at 12000 r.p.m., and at 58 degree centigrade or less at 15000 r.p.m.

Finally, the inner temperature of the housing 11 during the seek operation can be at 60 degree centigrade or less under the condition that the magnetic disk media are twelve, the magnetic disk drive is installed in the magnetic disk drive system without fan.

The conditions under which the above numerals are obtained are as follows: the medium is a "2.5 inches" (diameter: 65 mm, thickness: 0.635 mm), the stack has twelve media, the distance between media is 1.7 mm, L of fins=32 mm , the thickness t of the fins=2 mm, a circumferential temperature of the magnetic disk drive is 25 degree centigrade, the magnetic disk drive system has no fan.

The magnetic head 51 and an arm of the actuator 61 receive a force from a homogeneity air flow that is generated by rotation of the magnetic disk media. If the force which is received by the actuator 61 including the magnetic head 51, from the air flow can be decreased, the torque loss during on-load rotation of the magnetic disk media 21 further can be decreased, which results in suppressing the heat generation caused by windage.

Figure 2:
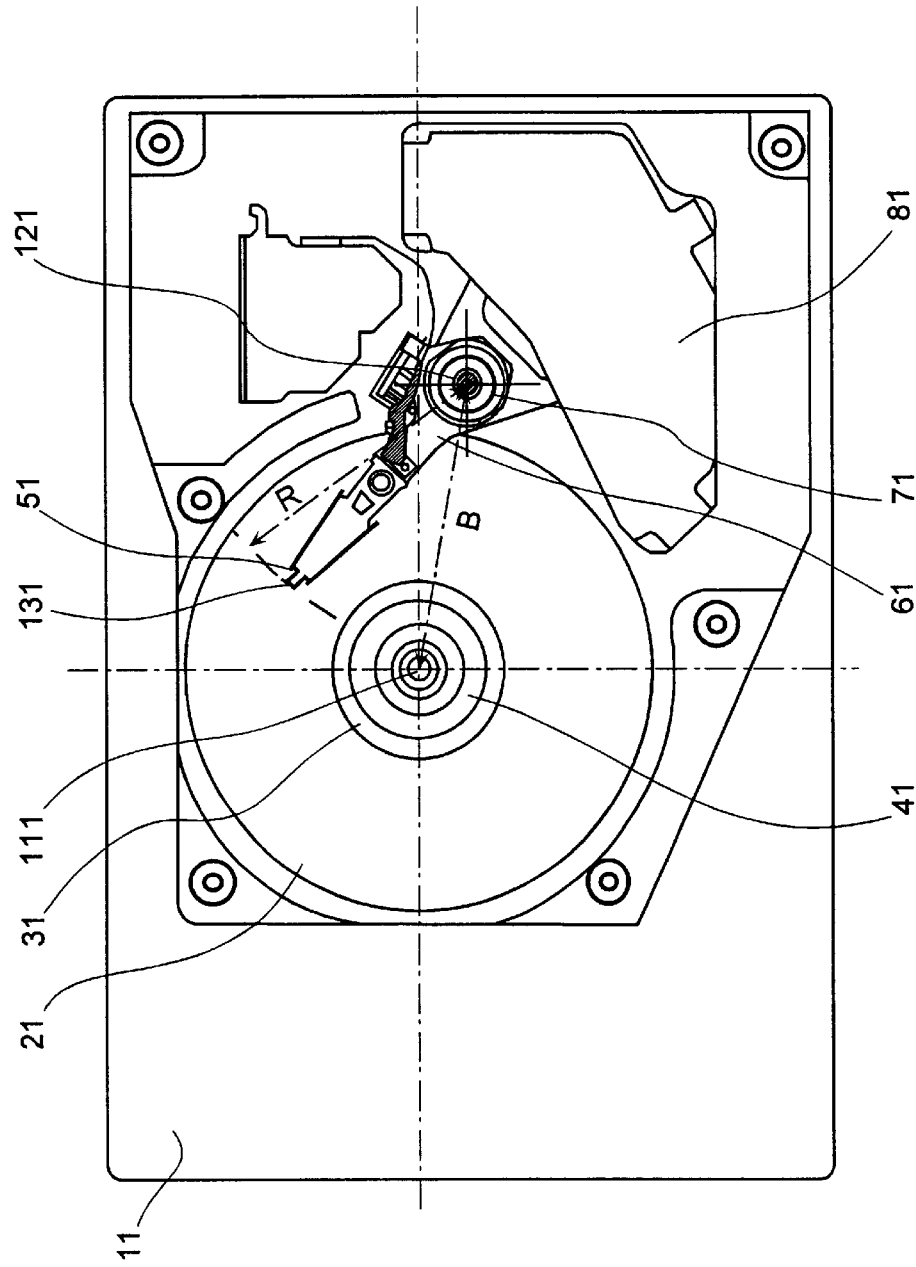
FIG. 2 shows a plan view of FIG. 1.

FIG. 2 shows a plan view of an arrangement with basic elementary parts in the magnetic disk drive shown in FIG. 1.

Figure 3:
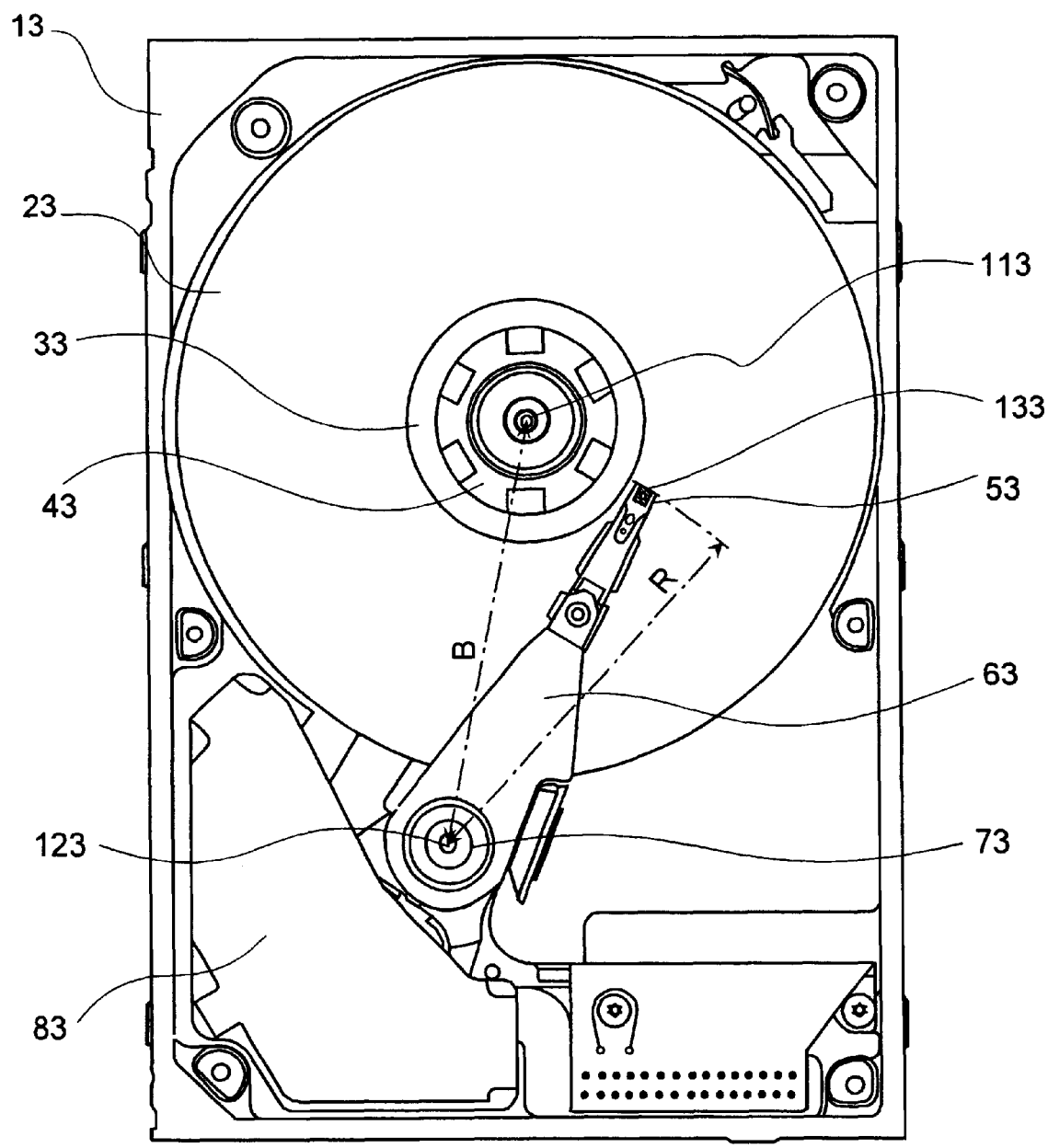
FIG. 3 shows a plan view of prior magnetic disk drive.

A distance B between a rotation center 111 of the magnetic disk media 21 and a rotation center 121 of the magnetic head 51 can be reduced comparing with the prior magnetic disk drive shown in FIG. 3 because the magnetic disk media 21 become smaller in diameter. Namely, if the distance B of them is set with 40 mm (FIG. 2), a gap on the magnetic head 51, which records or reproduces an information on or from the magnetic disk media 21, can be arranged at R=37.5 mm location from the rotation center 121. Incidentally, a corresponding distance B in the prior magnetic disk drive shown in FIG. 3, which is defined as a distance between a rotation center 113 of a magnetic disk media 23 and a rotation center 123 of a magnetic head 53, is 54 mm. Because the magnetic disk media 21 become smaller in diameter than prior media 23, a surrounding space of the media has a clearance with 15 mm. Therefore, 54 mm–15 mm=39 mm may be adopted as the distance B of FIG. 2. 40 mm±1 mm as the distance B seems to be realistic value considering a tolerance for fabrication.

Further, considering to use existing standard parts of the actuator for fabricating economic magnetic disk drives, the distance B of FIG. 2 may be 47.5 mm=the above R+10 mm. A deterioration in access speed should be compensated by increasing the torque of the voice coil motor in this case.

Present invention described above can make an actuator portion smaller and lighter than the prior actuator 63 including the magnetic head 53. More specifically, a weight of rotational portion at the actuator 61 including the magnetic head 51 (FIG. 2) is about 32 gf (gram-force) to 36 gf, and a moment of inertia of the rotational portion at the actuator 61 including the magnetic head 51 is about 5200 gf·square mm to 5800 gf·square mm. In the prior magnetic disk drive corresponding to FIG. 2, a weight or a moment of inertia of rotational portion at the prior actuator 63 are 45 gf or 14400 gf·square mm, respectively.

Applying the present invention, that is, in case the voice coil motor that gives an output power of 0.2 N·m per one ampere current in the prior magnetic disk drive of FIG. 3, is used for a voice coil motor 81 that drives an actuator 61, an average access time can be decreased to be about 6 milli-seconds in the magnetic disk drive. Here, the average access time defines an average time for the magnetic head 51 to be located from a start track to a destination track which are arranged concentrically on the magnetic disk media 21. Incidentally, twelve magnetic disk media 21 are used in this case, the rotational speed of the spindle is 10000 r.p.m.

Inventors of the present invention confirmed if the weight of rotational portion at the actuator 61 is smaller than 36 gf, or if a torque of the voice coil motor is bigger than 0.12 N·m per one ampere current, the average access time can be reduced more smaller. When the weight of rotational portion at the actuator 61 is smaller than 36 gf, and when the torque of the voice coil motor is 0.12 N·m per one ampere current, the average access time can be reduced by about 7 milli-seconds.

An actuator using the voice coil motor that has a torque of 0.12 N·m per one ampere current, gave 6.5 milli-seconds during a read operation, 7.5 milli-seconds during a write operation in average access times, respectively (in the third embodiment of present invention; a weight of rotational portion at the actuator is 53.0 gf.).

Figure 4:
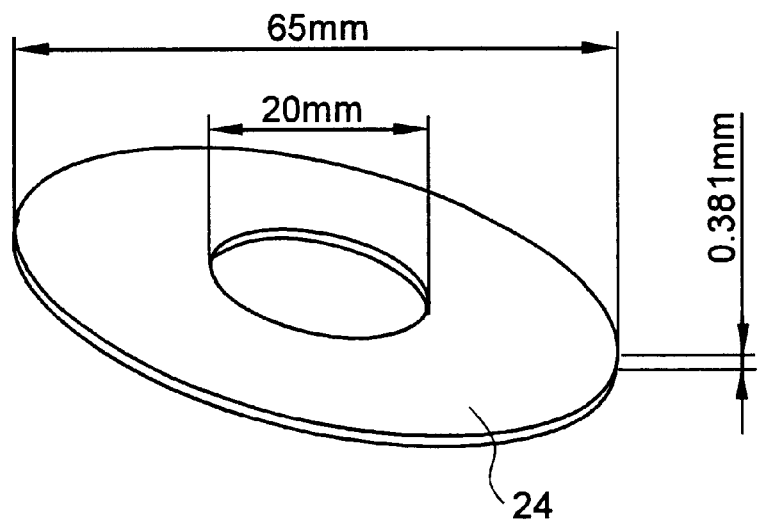
FIG. 4 shows an oblique view of a magnetic disk medium which has 2.5 inches form factor size in 0.381 mm thickness.
Figure 5:
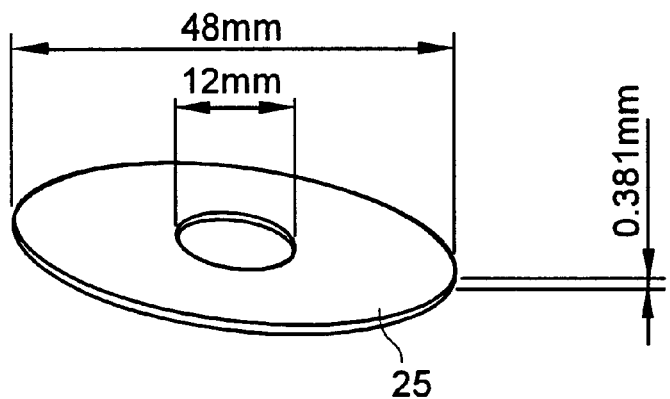
FIG. 5 shows an oblique view of a magnetic disk medium which has 1.8 inches form factor size in 0.381 mm thickness.
Figure 6:
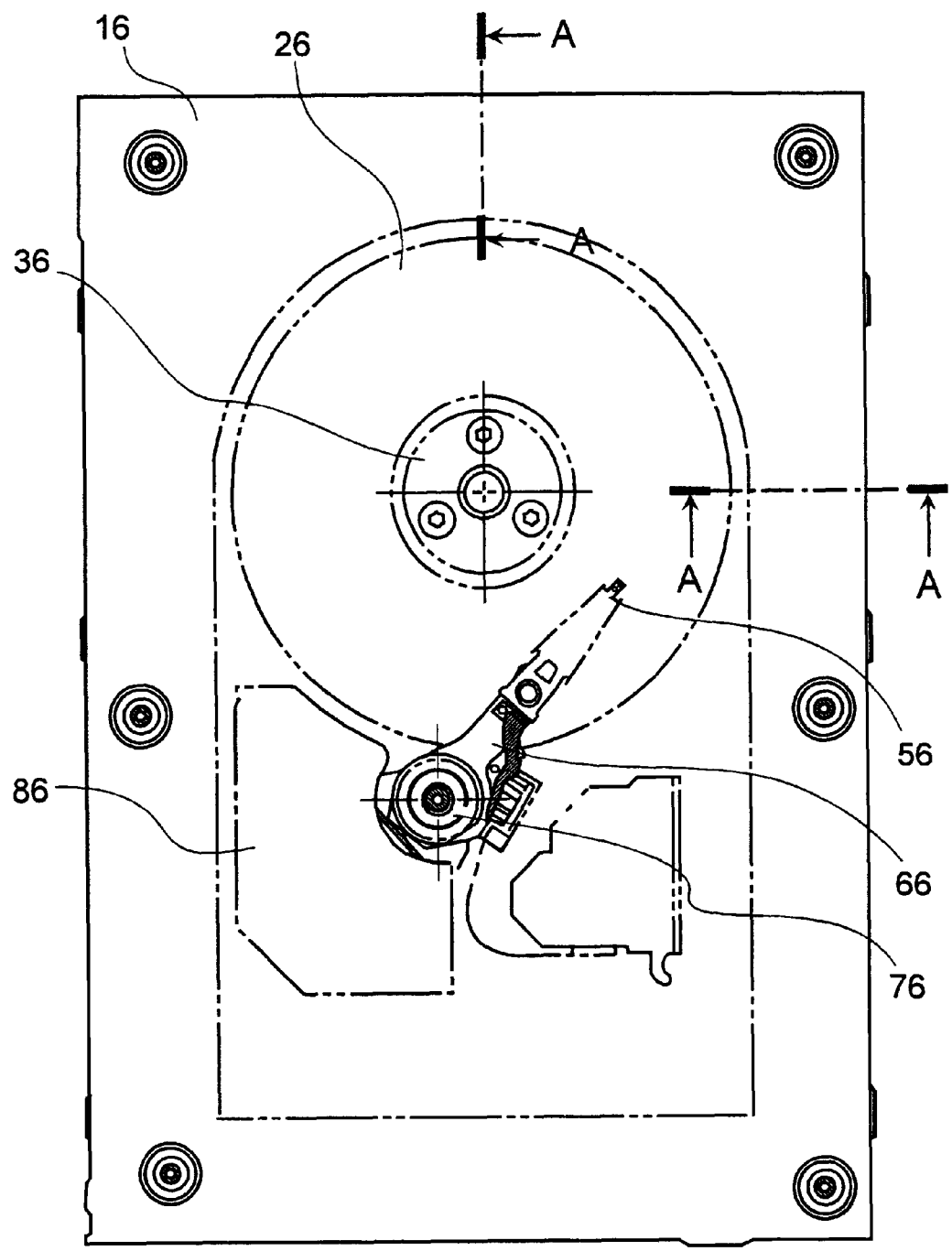
FIG. 6 shows a plan view of magnetic disk drive that is the second embodiment of present invention.
Figure 7:
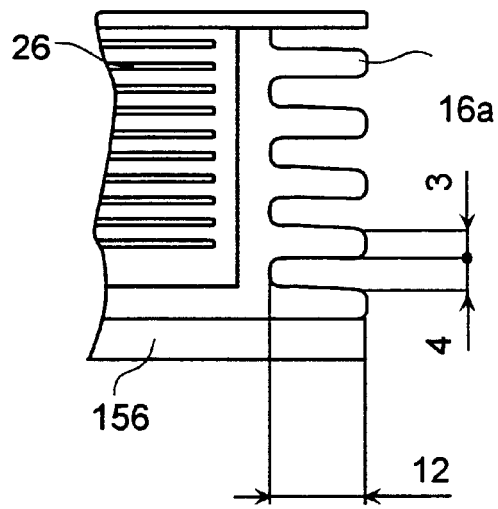
FIG. 7 is a cross sectional view between A—A portion that shows a fin shape in FIG. 6.

FIG. 4 shows a size of a magnetic disk medium which has 2.5 inches diameter and 0.381 mm thickness. FIG. 5 shows a size of a magnetic disk medium which has 1.8 inches diameter and 0.381 mm thickness. It gives surely above described same effects to exchange these disk media 24, 25 different in size, for magnetic disk media 21 shown in FIG. 1, and to mount them in the magnetic disk drive. FIG. 6 shows a plan view of the second embodiment of present invention, a magnetic disk drive which has 41.4 mm or 1.6 inches nominal height and 3.5 inches form factor size. FIG. 7 shows across section between A—A portion in FIG. 6.

The feature of this embodiment is that the magnetic disk drive arranges fins on all sides of housing 16 as same as shown in FIG. 1, and that the fins on one side consist of 4 linear fins 16a arranged at 4 mm interval, each fin has 3 mm thickness at the edge and 12 mm length, as shown in FIG. 7. Ten magnetic disk media 26 (FIG. 6), each of which has 65 mm in diameter and 0.8 mm in thickness, are accommodated at the housing at 1.84 mm interval (FIG. 7). They are secured to a spindle motor 36 (FIG. 6) that can drive them at 12000 r.p.m. rotational speed. A maximum temperature (during seek operation) in the housing 16 is held at 55 degree centigrade or less and an electric power consumption is 8.7 watts during an idle rotation in the above case. Incidentally, an environmental temperature of the magnetic disk drive is 25 degrees centigrade and there is no fan on a case frame of the magnetic disk drive system.

Figure 8:
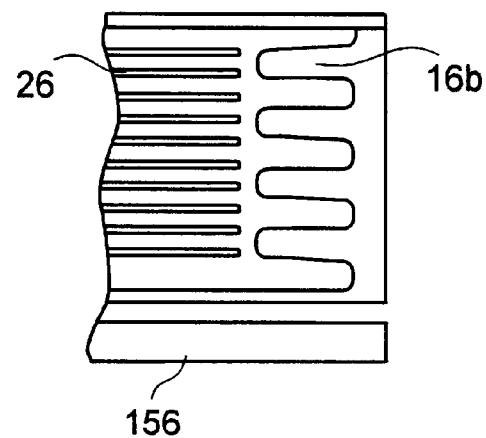
FIG. 8 is the second cross sectional view between A—A portion that shows a fin shape in FIG. 6.
Figure 9:
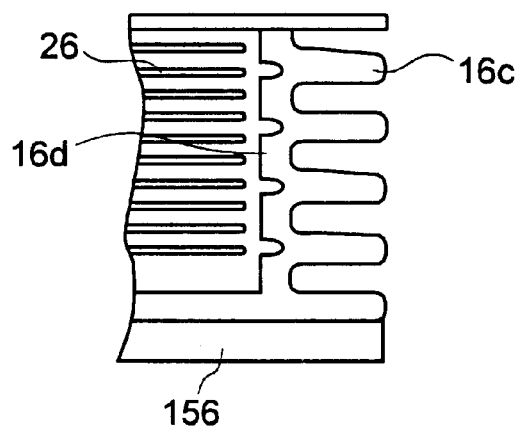
FIG. 9 is the third cross sectional view between A—A portion that shows a fin shape in FIG. 6.

FIG. 8 and FIG. 9 show other shapes of fins. FIG. 8 shows a cross section between A—A portion in FIG. 6 when fins 16b are arranged inside the housing 16. FIG. 9 shows a cross section between A—A portion in FIG. 6 when fins 16c and 16d are arranged inside and outside the housing 16.

Figure 10:
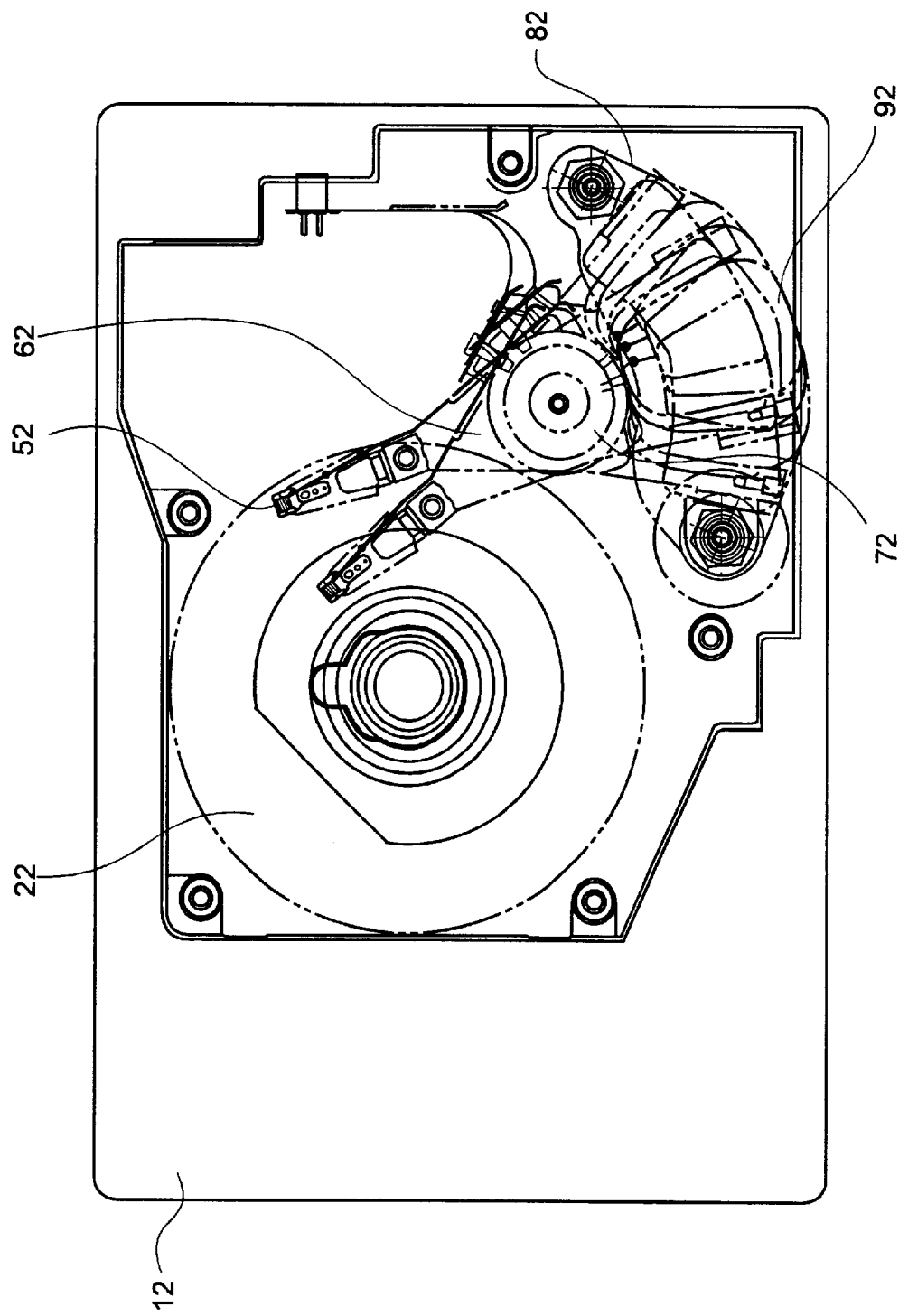
FIG. 10 shows a plan view of the third embodiment of present invention, which is a magnetic disk drive higher than a normal height.
Figure 11:
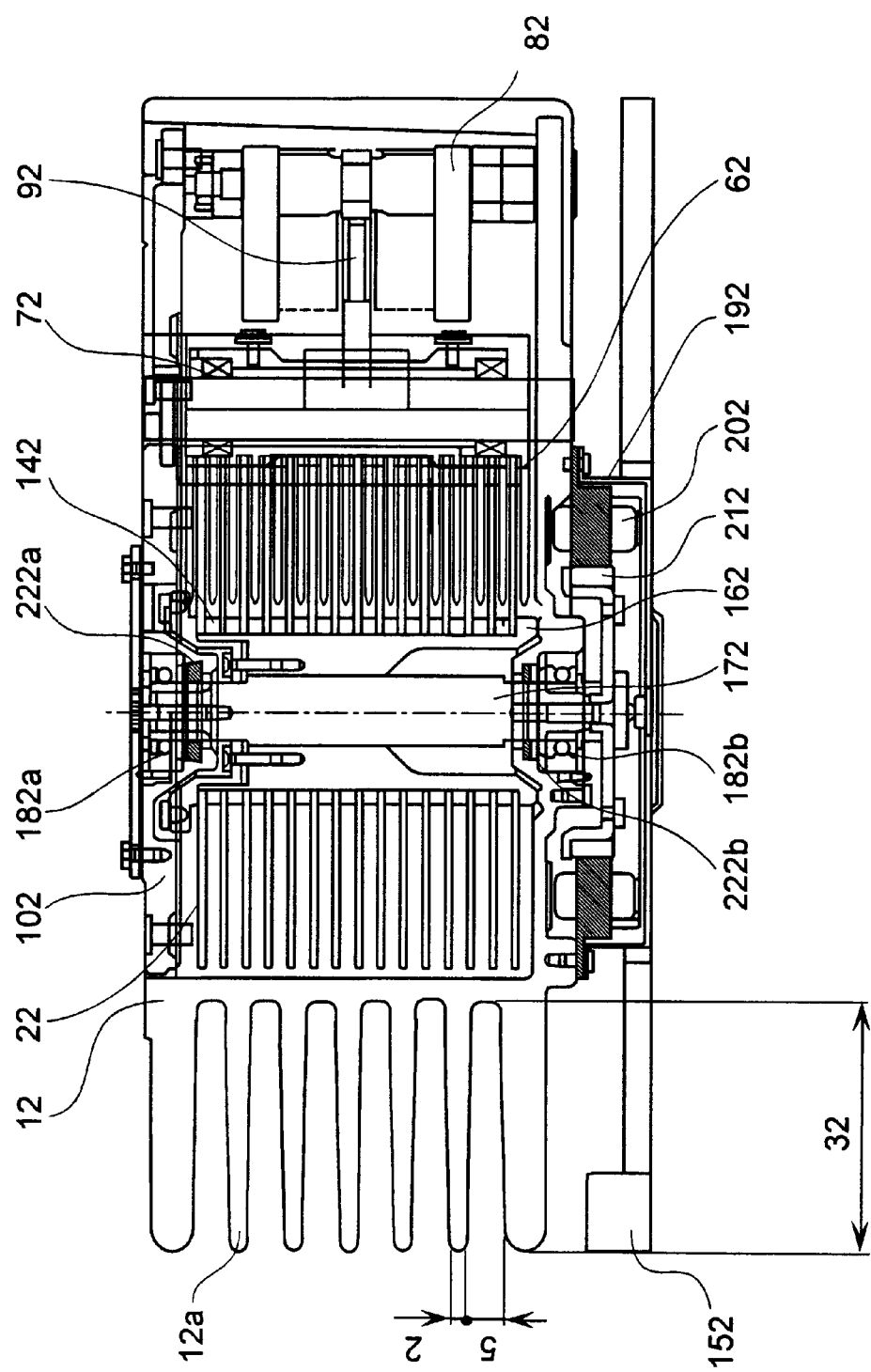
FIG. 11 shows a cross-sectional side view of FIG. 10.

FIG. 10 and FIG. 11 show the third embodiment of present invention, a "3.5 inches" magnetic disk drive which has 68 mm height. This is higher than a normal height of "3.5 inches" standard.

Fifteen magnetic disk media 22, each of which is 65 mm in diameter and 0.8 mm in thickness, are stacked to a hub 162 at 2 mm interval with interjacent disk spacers 142 that is 2 mm in thickness (FIG. 11). Here, for example, means (a spindle motor) capable for rotating the magnetic disk media 22 at 12000 r.p.m. rotational speed, equip its coil 202, stator core 192 and magnet 212 outside the housing in the rotational axis direction of hub 162.

There are five fins 12a at 5 mm interval on one side of the housing 12. An edge portion of the fin 12a is 2 mm in thickness. A length of the fin is 32 mm. PCB (printed circuit board) 152 adopts SCSI-2 interface(s) and it has terminals for supplying electric power with voltages, 12 volt and 24 volt. The terminals are arranged with a clearance, about 7 mm toward the housing 12. Here, these voltages are exemplifications. If a desirable rotational speed is obtained, other voltages except 12 volt or 24 volt are available. Some value in voltage may be adopted, which is decided by characteristic of a spindle motor.

Features of this embodiment are as follows:

1) this magnetic disk drive adopts a spindle motor located vertically under the housing 12 in FIG. 11, which is called a bottom type spindle motor and which rotates inner wheels of bearings 182a and 182b in order to avoid a leakage of magnetic fluid sealants and an abrasion of bearings which are caused from a high speed rotation of the spindle motor and the magnetic disk media. Consequently, the bottom type spindle motor does not affect badly to a grease in the bearings and the magnetic fluid sealants 222a, 222b;

2) this magnetic disk drive adopts a high voltage of the electric power supply which gives an enough rush current to spin up the spindle motor and which compensates a voltage drop in a driving circuit. The spindle motor can rotate stably in high speed owing to an enough torque for rotating the magnetic disk media.

PCB 152 is arranged with a clearance, about 7 mm toward the housing 12 to restrain a temperature rising of the magnetic disk drive, which is caused by a heat generation of the PCB. Consequently, the magnetic disk drive of this embodiment gives 1) 6 giga-bytes in formatted storage capacity, 2) 10 watts electric power consumption or less, 3) 55 degree centigrade in inner temperature of the housing 12 (during seek operation) when an environmental temperature of the magnetic disk drive is 25 degrees centigrade and there is 2 meters per second of a cooling air flow caused by fans on a case frame of the magnetic disk drive system. Incidentally, a transfer rate from the magnetic disk drive to an upper system is 10 mega-bytes per second or more. Data transfer rate is expected to be increased more by an optimization of electric circuits.

Regardless of this embodiment, if coil 202 and stator core 192 of the spindle motor and all the like driving means there, are arranged far enough from the exterior of the housing 12, and if the clearance between PCB 152 and the housing 12 is set to 10 mm or more, the temperature rising of the magnetic disk drive can be further restrained.

Figure 12:
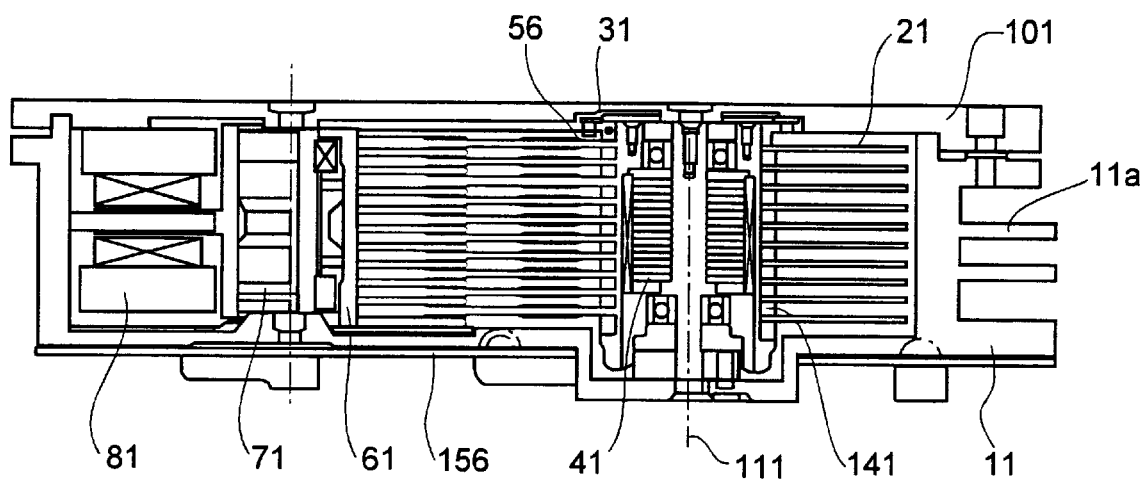
FIG. 12 is a cross-sectional side view of a magnetic disk drive, which shows the fourth embodiment of the present invention.

FIG. 12 is a cross-sectional view that shows an outline of the internal structure of the magnetic disk drive, fourth embodiment of the present invention. A housing 11 and a cover 101 are sized in a 3.5 inches form factor which has a nominal height of 41.4 mm. "2.5 inches" magnetic disk media 21 (65 mm in diameter and 0.8 mm in thickness), a spindle motor 41 that rotates these media in a predetermined rotational speed, a rotary type actuator 61 that swings around a pivot-bearing 71 for positioning magnetic heads, and a voice coil motor 81 that drive the actuator, are secured in the housing 11.

A securing method of the spindle motor 41 is with a screw or by a press fit to be secured at one edge of the spindle motor 41 to the housing 11 that includes the spindle motor 41. The other edge of the spindle motor 41 is secured at a cover 101 that hermetically closes the inner space of the housing 11. Magnetic disk medium 21 uses Al (aluminum) or glass for its substrate material.

Ten magnetic disk media 21 are stacked in a rotational axis direction at 1.84 mm interval with interjacent disk spacers 141 that is 1.84 mm in thickness. The magnetic disk media 21 are secured by a disk cramp 31 to the spindle motor 41 that can rotates in a rotational speed of 12000 r.p.m. The housing 11 casted with an aluminum alloy has en bloc linear fins 11a stood straight against 111 axis of the rotary center of magnetic disk media 21. The thickness at the leaf edge t=2.5 mm, the leaf length L=12 mm, a distance H between leaf edges is 3.5 mm.

If the housing is casted en bloc, a thickness of the housing prefers to be kept 1.5 mm or more in order to give a smooth-running with melting materials during the casting and to uniform mechanical or physical characteristics of a casted product. The product needs taper portions in case it is locked inside a casting flask by a shrinkage that follows a cooling of the product when the product is separated from the casting flask. The amount of the taper is about 1 degree in angle. If an edge of fin that has 12 mm in length is 1.5 mm in thickness, a basal thickness of the fin is 1.9 mm. If an edge has 15 mm in length, a basal thickness of the fin is about 2 mm.

As magnetic disk media 21 becomes smaller in diameter, for example, as changing "3.5 inches" disk media to "2.5 inches" disk media in same thickness of 0.8 mm, a weight per one disk medium reduces by about 54%. In other thickness of 0.635 mm, as changing to "2.5 inches" disk media, the weight per one disk medium reduces by about 64%. Therefor, a gross weight that the spindle motor rotates can be reduced, which brings a high characteristic at a spin-up operation, and which also effects a reduction of electric current (electric energy consumption) during an idle rotation.

If magnetic disk media are changed from "3.5 inches" to "2.5 inches", for example, a maximum marginal velocity when the "3.5 inches" disk media rotate at 10000 r.p.m. equals to a maximum marginal velocity when the "2.5 inches" disk media rotate at 14600 r.p.m. Therefore, when recording or reproducing an dedicated information to or from the magnetic disk media 21 by a magnetic head 51 via a magnetic flux, if a signal processing ability is same as in the past or more, faster rotation of the media can be executed without a reduction of recording density in longitudinal direction along a track that is located concentrically on the magnetic disk media 21.

When magnetic disk media 21 rotate, they receive a frictional resistance by a viscosity of air that surrounds the magnetic disk media 21. A transition boundary where an air flow along a surface of the magnetic disk media becomes from a laminar flow to a turbulent flow is about 15000 r.p.m. when the magnetic disk media 21 is "3.5 inches" disk, and about 30000 r.p.m. when the media is "12.5 mm inches" disk.

When magnetic disk media 21 are changed from "3.5 inches" to "2.5 inches", the transition boundary is big enough against the number of rotation limits of the spindle motor 41. Because an torque loss during on-load rotation, which is caused from the frictional resistance, becomes bigger square or cubicly proportional to a diameter of the magnetic disk media, if the spindle rotates the media in a same speed, the torque loss of "2.5 inches" disk media corresponds to about 50%~34% of that of "3.5 inches" disk media. Therefore, when the spindle motor 41 rotates in a predetermined idle speed, the current (consumption power) becomes smaller, and a heat generation caused by windage can be restrained.

Fins 11a are made at plural portions of the housing 11, which have an effect that increases a surface area of the housing 11 and that makes a heat-penetration flow good. The tips of fins 11a become closer to the temperature of the external air of housing 11. The rotation of spindle motor 41 and the flutter of actuator 61 driven by the system generate a heat, which rises an internal temperature of the magnetic disk drive. The fins 11a reduce this temperature increase.

Figure 13:
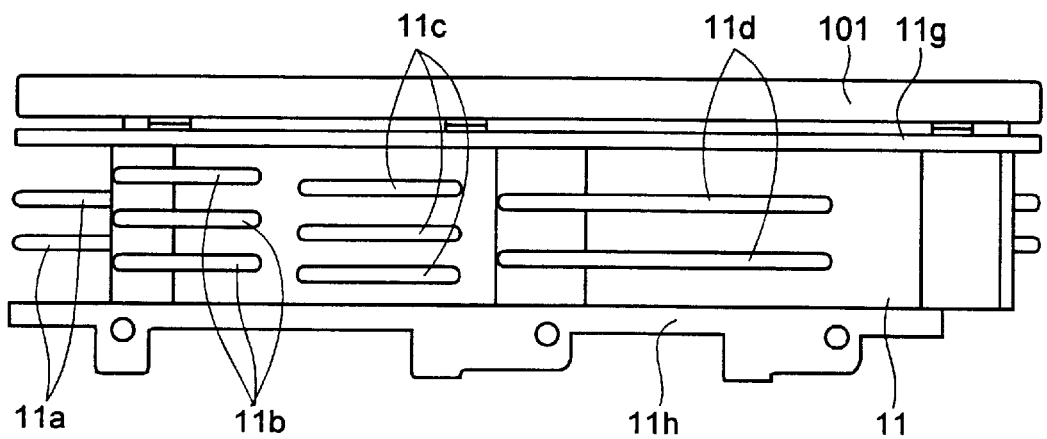
FIG. 13 is a side view in depth direction of FIG. 12.

The thickness of the fin at the edge or tip may be 1.5 mm or more, considering its easier fabrication. If a length of the fin is elongated, a surface area of the fin becomes larger. A temperature of an air that flows along the fin increase because a heat from the fin and a heat by a viscosity resistance are conducted to the air. Therefore the fin should be divided into plural portions. FIG. 13 shows shapes of fins divided into three d 11*b*, 11*c*, 11*d* in a depth direction of the magnetic disk drive.

Here, a height direction is defined to be called a thickness direction if the magnetic disk drive stands as a rotational axis of its hub is vertical. A longer side is defined to be called a depth direction and a shorter side, a width direction if the magnetic disk drive is seen from a bird's-eye view. These divided fins are arranged like steps of stairs, which change in position in the thickness direction.

The fins are located in a space that is surrounded by a base (housing) 11, a mounting portion 11*g* which mounts a cover 101 and a mounting portion 11*h* which mounts a circuit board. This space also forms a pass for an air flow 300 shown in FIG. 14.

Figure 14:
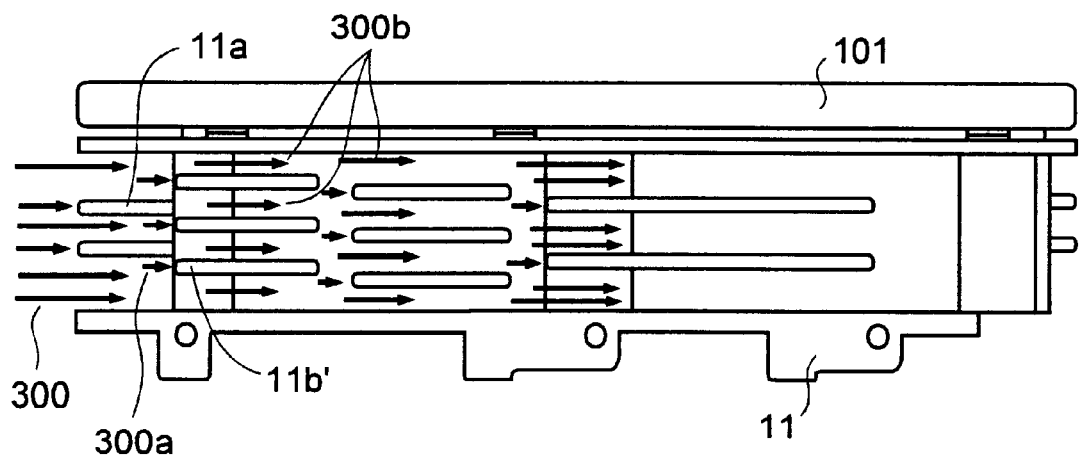
FIG. 14 is a side view in depth direction of the fourth embodiment, which shows an air flow.
Figure 18:
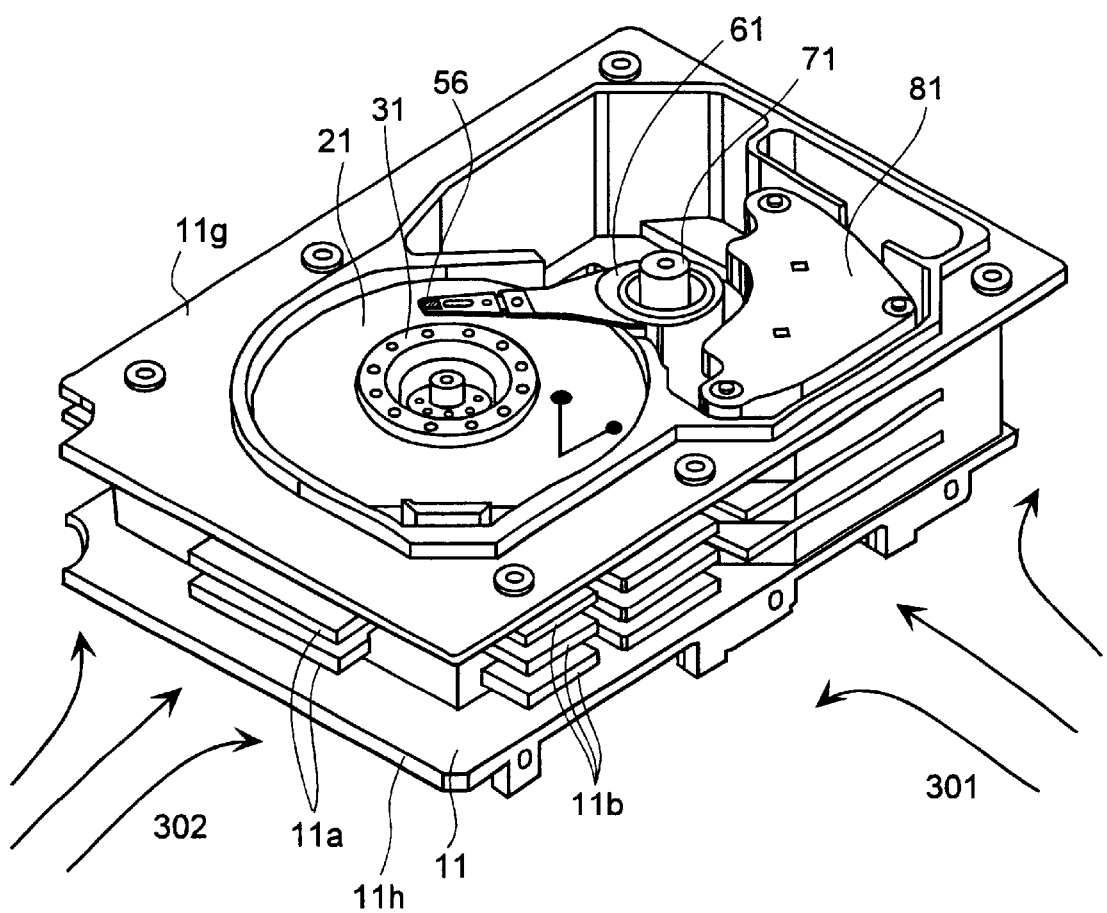
FIG. 18 is an oblique view of a magnetic disk drive which shows the fourth embodiment of present invention.

Fins 11*a*, 11*b*, 11*c* and 11*d* have a function that can enhance a cooling efficiency of the magnetic disk drive about air flows those are shown by arrow marks 300, 301 and 302 in FIG. 14 and FIG. 18. The portion of the fins, which encounters with the air flow is cooled best in the air flow. The cooling efficiency decreases for the air's going downstream from the encounter portion owing to a development of a boundary layer. Therefore the best efficiency about the air flow is given by a bossy fin.

On the other hand, a radiation area decides a cooling efficient if there is no air flow. Therefore, a strap shape fin is effective in this case. Further, if it is considered to assemble or to cast en bloc with the housing 11 and fin 11*a* etc. of the magnetic disk drive, practical shapes of the fins those have good cooling efficiency are, as shown in present embodiments, plural sets of short strap shape fins, which are arranged surrounding the magnetic disk drive.

It is desirable for fins and air flow to encounter or to collide each other as possible as they can. And it is necessary to keep an energy loss of the air flow small, to maintain the air-current speed and to hold the pass open. It is also a desirable configuration of the fin to have smooth roundness at the corners (air-collision portion) that directly encounter the air flow in order to keep the loss of air flow small and to maintain the cooling efficiency high when the air flow collides with the corners.

Therefore in present invention that takes the above phenomenon into consideration, plural strap-shape fins are arranged changing in position in the thickness direction. That is, FIG. 14 shows the air flow 300 comes from left hand. Some air flow shown as short arrow 300*a* collides with a round portion 11*b*' of leading edge of the fin one after another, cooling the leading edge preferentially and going through to right hand of FIG. 14.

Passes shown as long arrows 300*b* are arranged for some other air flow besides the collision air in order to keep the air-current speed. Consequently, among width-direction fins 11*a* and depth-direction fins 11*b*, 11*c* and 11*d* (FIG. 13), neighbor sets of fins differ in height (location in the thickness direction) and are arranged changing in their heights one after another.

Figure 15:
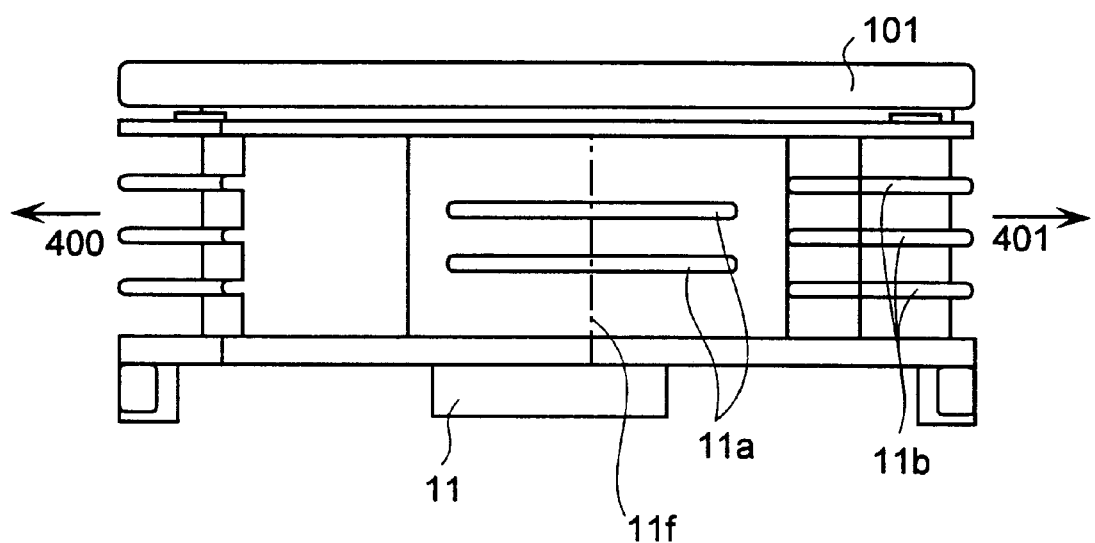
FIG. 15 is a side view in width direction of FIG. 12.

FIG. 15 shows one set of fin 11*a* in the width direction and the row is one column (set) because a flask is used to form the fins by en bloc casting. So called sliding cores those separate in bidirectionally, right and left respectively, form fins in the depth direction and in the width direction. Right and left sliding cores meet at a center portion (11*f*) of fins in the width direction and form the fins 11*a*. In separation, each of the sliding cores goes along the arrow 400, 401 shown in FIG. 15, respectively, and the product is released.

Figure 16:
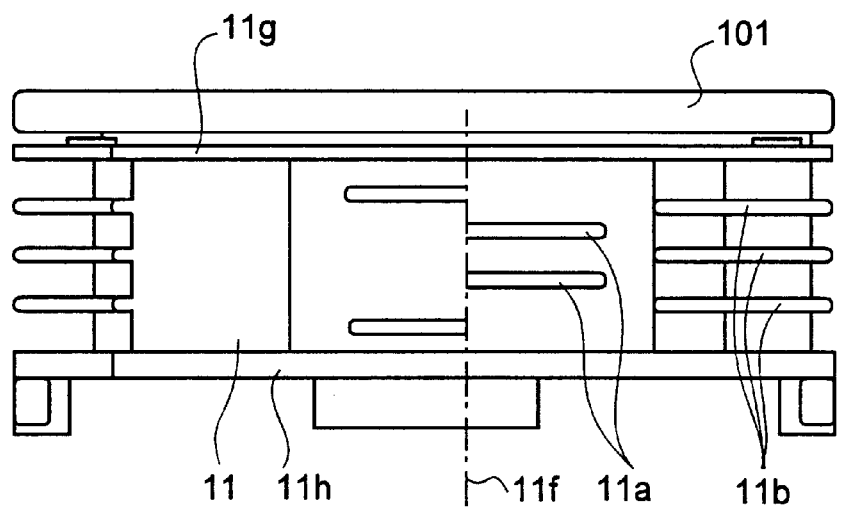
FIG. 16 is a deformed side view in width direction of FIG. 12.

Fins 11*a* in the width direction become a single row fins when the roundness of their corners are formed by casting. At most two row fins (FIG. 16) changing in their heights can be fabricated when the roundness of their corners are worked afterwards without casting. A parting face (separation face) of the sliding cores define a boundary between the two row fins. The fins in present invention can reserve about 70,000 square milli-meter or more as the surface area of the magnetic disk drive.

Further explanation about the flask is complemented using FIG. 15. A flask for casting the base 11 consists of a normal main flasks those separate up-and-down direction of FIG. 15 and sliding cores those form fins 11*a*, 11*b*. The sliding cores slide in predetermined directions accompanying with a separating operation of the normal main flasks. The sliding cores may consist of three members or more in order to form fins in a predetermined shape. On the other hand, the sliding cores may be two members according to a heat generation of the magnetic disk drive or to keep a freedom in fabrication of the mounting portion that mounts a circuit board.

FIG. 18 shows a varied embodiment which is increased in height of mounting portion 11*g* that mounts cover 101 to base (housing 11), satisfying 3.5 inches form factor size. In this embodiment:

a) an electric power consumption (during an idle rotation) loaded 10 disk media can be restrained as 5.5 watts at 10,000 r.p.m. rotational speed, and 7.0 watts at 12,000 r.p.m. rotational speed;

b) a temperature rising (during following operation, an environmental temperature is 32 degrees centigrade) can be restrained at 40 degrees centigrade or less at 12,000 r.p.m rotational speed. With out a cooling air flow, it can be restrained at 46 degrees centigrade or less at 10,000 r.p.m. rotational speed, at 52 degrees centigrade or less at 12,000 r.p.m. rotational speed.

The numerals above described are obtained under the condition that ten "2.5 inches" media (65 mm in diameter, 0.635 mm in thickness) are installed at 1.84 mm interval in a magnetic disk drive with fins those are 12 mm in length and 2 mm in thickness. And that an environmental temperature of the magnetic disk drive is 32 degrees centigrade and there is no cooling air flow caused by fans on a case frame of the magnetic disk drive system.

The magnetic head 51 and an arm of the actuator 61 receive a force from a homogeneity air flow that is generated by rotation of the magnetic disk media. If the force which is received by the actuator 61 including the magnetic head 51, from the air flow can be decreased, the torque loss during on-load rotation of the magnetic disk media 21 further can be decreased, which results in suppressing the heat generation caused by windage.

Figure 17:
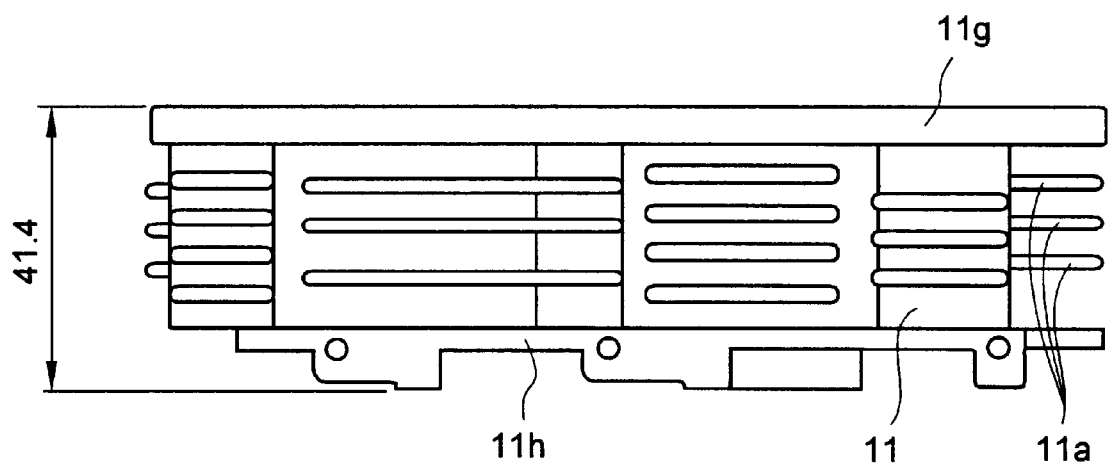
FIG. 17 is a side view in depth direction of a magnetic disk drive that shows the fifth embodiment of present invention.

FIG. 17 shows fifth embodiment of the present invention. Namely, a cover mounting portion 11*g* is extended upwards to be 41.4 mm, air passes are enlarged and numbers of fins are increased.

Figure 19:
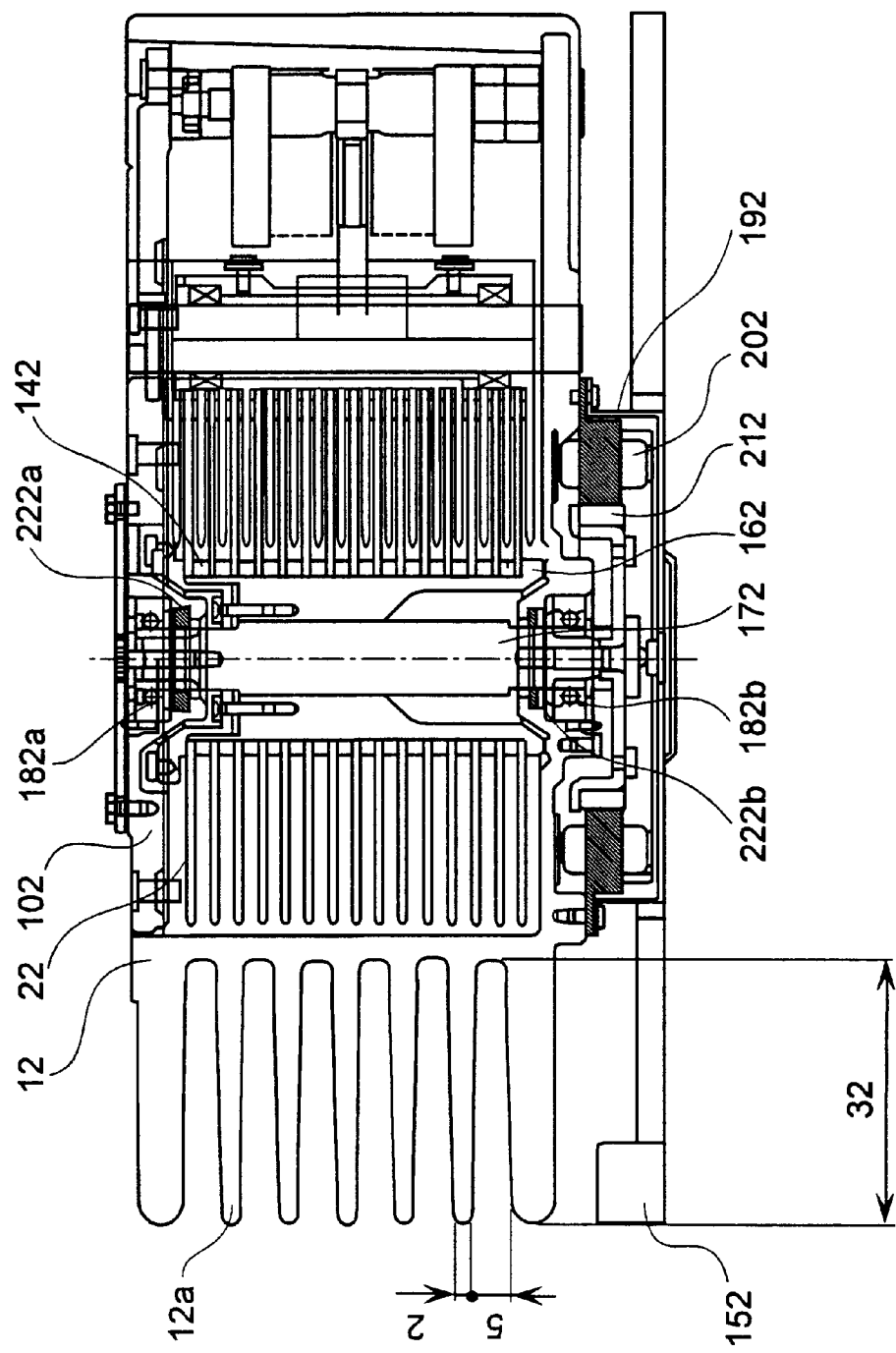
FIG. 19 is a cross sectional side view of the sixth embodiment of present invention, which shows a magnetic disk drive higher than normal.

FIG. 19 shows sixth embodiment of the present invention, 68 mm height "3.5 inches" magnetic disk drive, which has a larger height than normal "3.5 inches" standard. Fifteen magnetic disk media 22 are stacked on a hub 162 at 2 mm interval with interjacent disk spacers 142 (FIG. 19) that is 2 mm in thickness. Here, for example, means (a spindle motor) capable for rotating the magnetic disk media 22 at 12000 r.p.m. rotational speed, equip its coil 202, stator core 192 and magnet 212 outside the housing in the rotational axis direction of hub 162. There are five fins 12a at 6 mm interval on one side of the housing 12. An edge portion of the fin 12a is 2 mm in thickness. A length of the fin is 32 mm.

PCB (printed circuit board) 152 adopts SCSI-2 interface (s) and it has terminals for supplying electric power with voltages, 12 volt and 5 volt. Features of this embodiment are as follows.

1) this magnetic disk drive adopts a spindle motor located vertically under the housing 12 in FIG. 19, which is called a bottom type spindle motor and which rotates inner wheels of bearings 182a and 182b in order to avoid a leakage of magnetic fluid sealants and an abrasion of bearings which are caused from a high speed rotation of the spindle motor and the magnetic disk media. Consequently, the bottom type spindle motor does not affect badly to a grease in the bearings and the magnetic fluid sealants 222a, 222b;

2) this magnetic disk drive adopts a high voltage of the electric power supply which gives an enough rush current to spin up the spindle motor and which compensates a voltage drop in a driving circuit. The spindle motor can rotate stably in high speed owing to an enough torque for rotating the magnetic disk media.

PCB 152 is arranged with a clearance, about 7 mm toward the housing 12 to restrain a temperature rising of the magnetic disk drive, which is caused by a heat generation of the PCB 152.

Consequently, the magnetic disk drive of this embodiment gives 1) 15 giga-bytes in formatted storage capacity, 2) 14 watts electric power consumption or less, 3) a transfer rate from the magnetic disk drive to an upper system is 10 mega-bytes per second or more.

Data transfer rate is expected to be increased more by an optimization of electric circuits. Regardless of this embodiment, if coil 202 and stator core 192 of the spindle motor and all the like driving means are arranged far enough from exterior of the housing 12. and if the clearance between PCB 152 and the housing 12 is set in 10 mm or more, the temperature rising of the magnetic disk drive can be further restrained.

Figure 20:
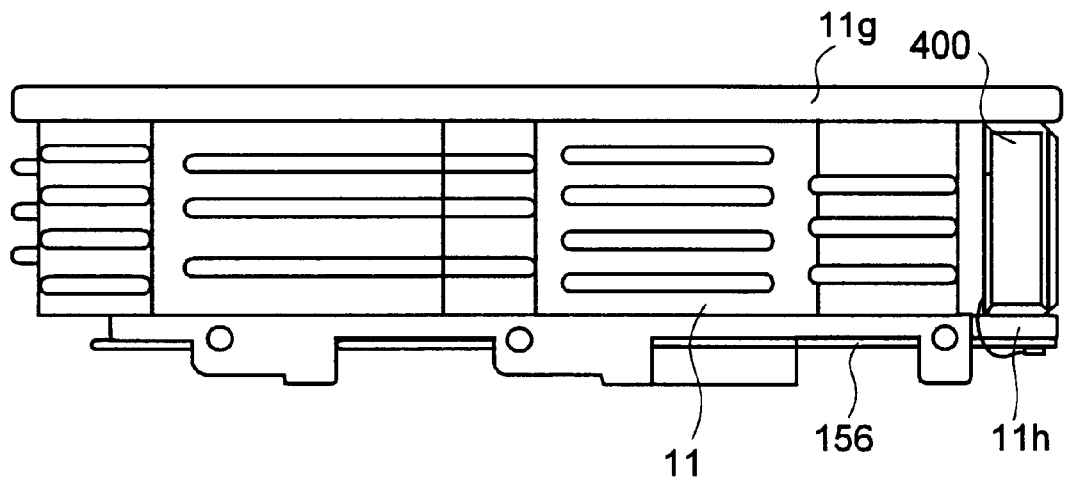
FIG. 20 is a side view in depth direction of a magnetic disk drive that shows the seventh embodiment of present invention.

FIG. 20 shows seventh embodiment of the present invention, that is, a magnetic disk drive mounted directly with a cooling fan 400. The cooling fan 400 is driven by a circuit board PCB, printed circuit board). As shown in Figure, the cooling fan 400 is arranged in order to make an air flow through above described air passes. which are surrounded by a cover mounting portion 11g and circuit board mounting portion 11h. The direction of the air flow by the cooling fan 400 may be variable.

Figure 21:
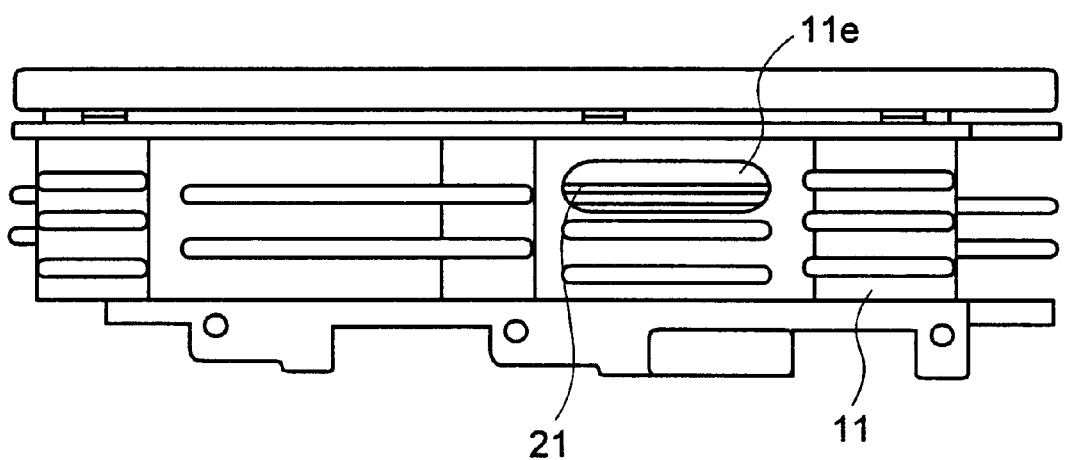
FIG. 21 is a side view in depth direction of a magnetic disk drive that shows the eighth embodiment of present invention.

FIG. 21 shows the eighth embodiment of present invention.

In this magnetic disk drive, a magnetic disk head 56 is so correctly positioned that positioning servo signals are written on magnetic disk media 21 before the magnetic disk drive is shipped.

The writing of the servo signals are performed after a base (housing 11), a cover 101, disk media 21, spindle motor 41 or the like of structural parts are assembled. It needs a reference signal to write the servo signals. The magnetic disk drive needs a hole 11e through which the reference signal is provided. The hole 11e needs to be arranged on a side of the base (housing 11). So, it is necessary for forming the hole 11e to use sliding cores in casting flask. The sliding cores can make the fins 11a and the hole 11e on a same face, which makes the housing 11 formation (casting fins 11a etc. en bloc) more easy.

Figure 22:
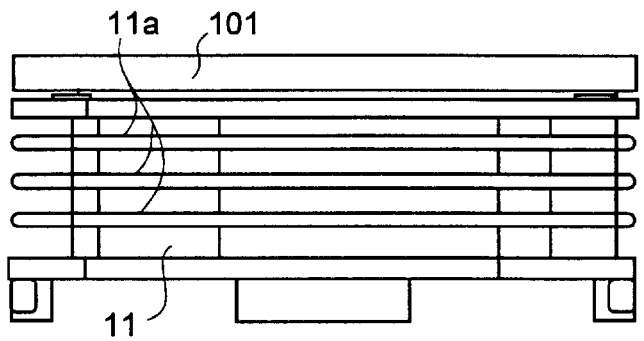
FIG. 22 is a side view in width direction of a magnetic disk drive that shows the ninth embodiment of present invention.

FIG. 22 shows the ninth embodiment of present invention.

Figure 23:
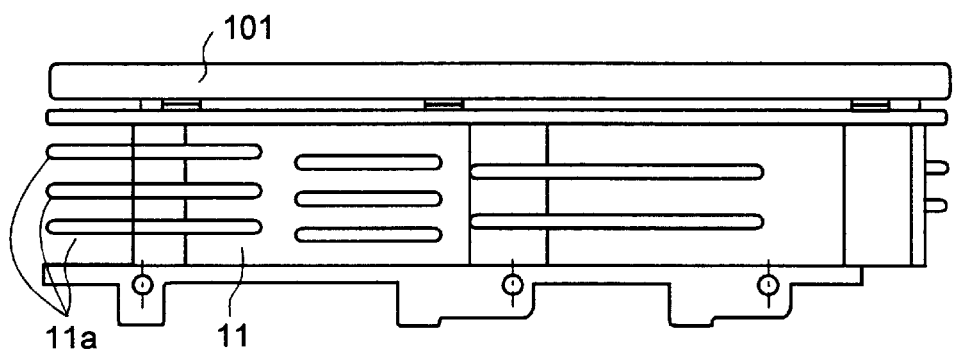
FIG. 23 is a side view in depth direction of a magnetic disk drive shown in FIG. 22.
Figure 24:
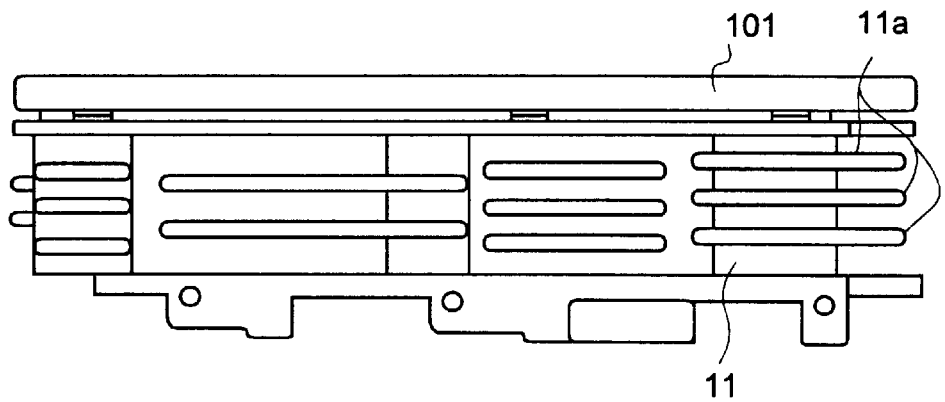
FIG. 24 is a side view in depth direction of a magnetic disk drive shown in FIG. 22.

Fins 11a in the width direction are extended further. A portion of them reaches side faces in the depth direction shown in FIG. 23 and FIG. 24. In this embodiment that increase a surface area, dividing casting flasks (sliding cores) into right and left directions can form fins 11a.

Figure 25:
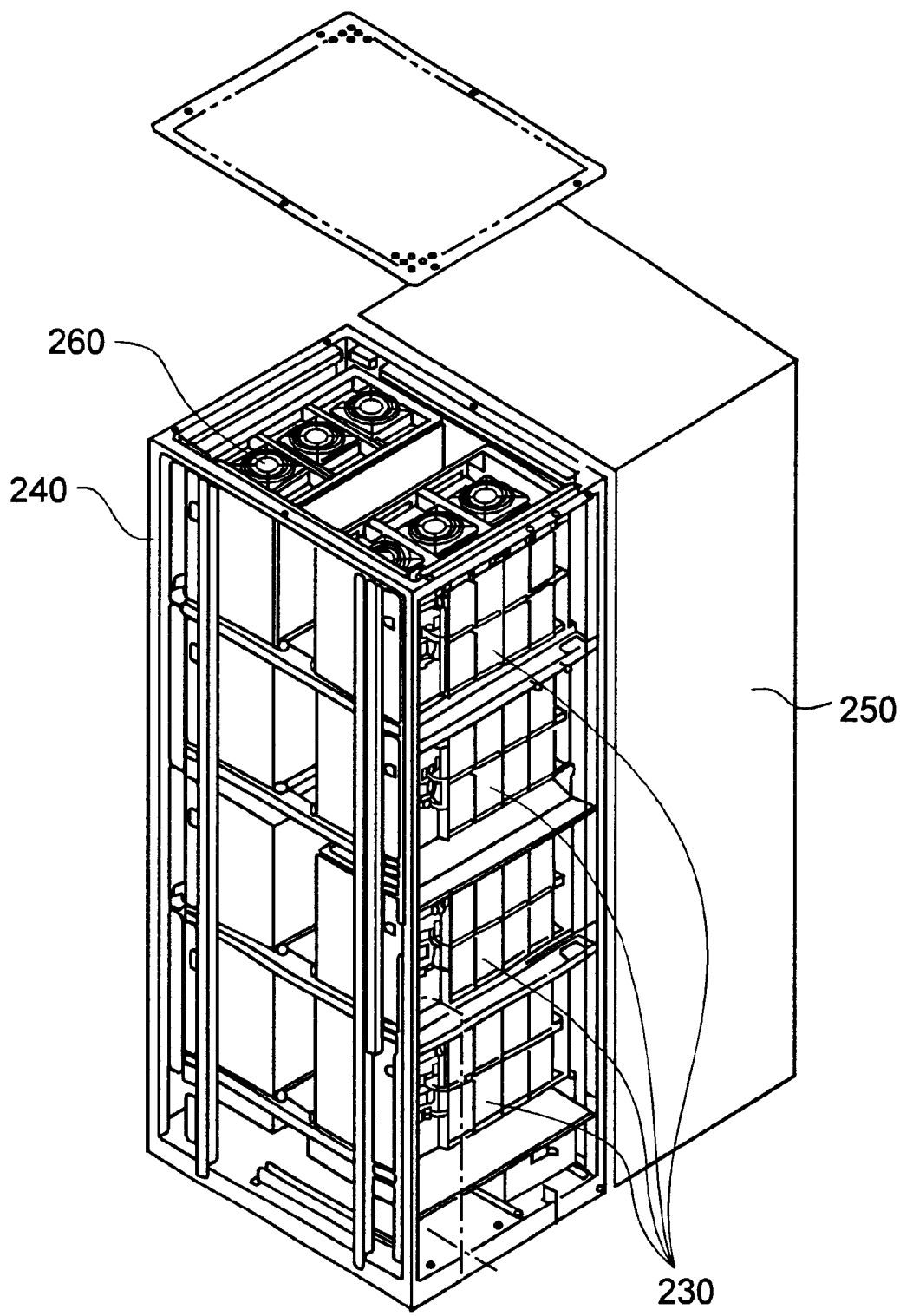
FIG. 25 is an architecture of a magnetic disk drive system that mounts the magnetic disk drive of present invention.

FIG. 25 shows a schematic of a magnetic disk drive system or a disk array system, which connects a plurality of magnetic disk drive 230 that is explained in FIG. 1, FIG. 6, FIG. 10 and FIG. 11.

The magnetic disk drive system sets a case 240 that mounts or secures plural magnetic disk drives 230, and a control unit 250 within the case. The control unit 250 couples electrically the plural magnetic disk drives 230 and controls them. Further the magnetic disk drive system sets fans 260 that refrigerate the control unit 250 and the plural magnetic disk drives 230. The fan 260 can be omitted if temperature circumstances surrounding the system at a installation place are favorable or if a number of magnetic disk drives mounted on the system is small enough. The fans 260 may be arranged for cooling plural magnetic disk drives mainly. Special fans 260 may be arranged for the control unit 250.

Control unit 250 mainly receives data from or transmits data to plural magnetic disk drives, the magnetic disk drive system or the upper system that uses the magnetic disk drives or the magnetic disk drive system, and mainly administer control information.

When an air flow by the fan 260 is 2 meter per second, a maximum temperature (during seek operation) in the housing of the magnetic disk drive 230 is held at 55 degree centigrade or less. Here, parameters around this magnetic disk drive are as follows: magnetic disk media have a 65 mm in diameter for "2.5 inches" size and a 0.8 mm in thickness; an interval or a distance of the media is 2.0 mm; a length of fins arranged around the media is 32 mm and a thickness of the fins is 2 mm, a number of leaves in magnetic disk media is 15; a rotational speed of a spindle that rotates the media is 12000 r.p.m.; an electric power consumption is 10 watts during an idle rotation in the above magnetic disk drive; a distance between a hub center and an actuator center is 43.2 mm; and a weight of rotational portion at the actuator is 53.0 gf.

Figure 26:
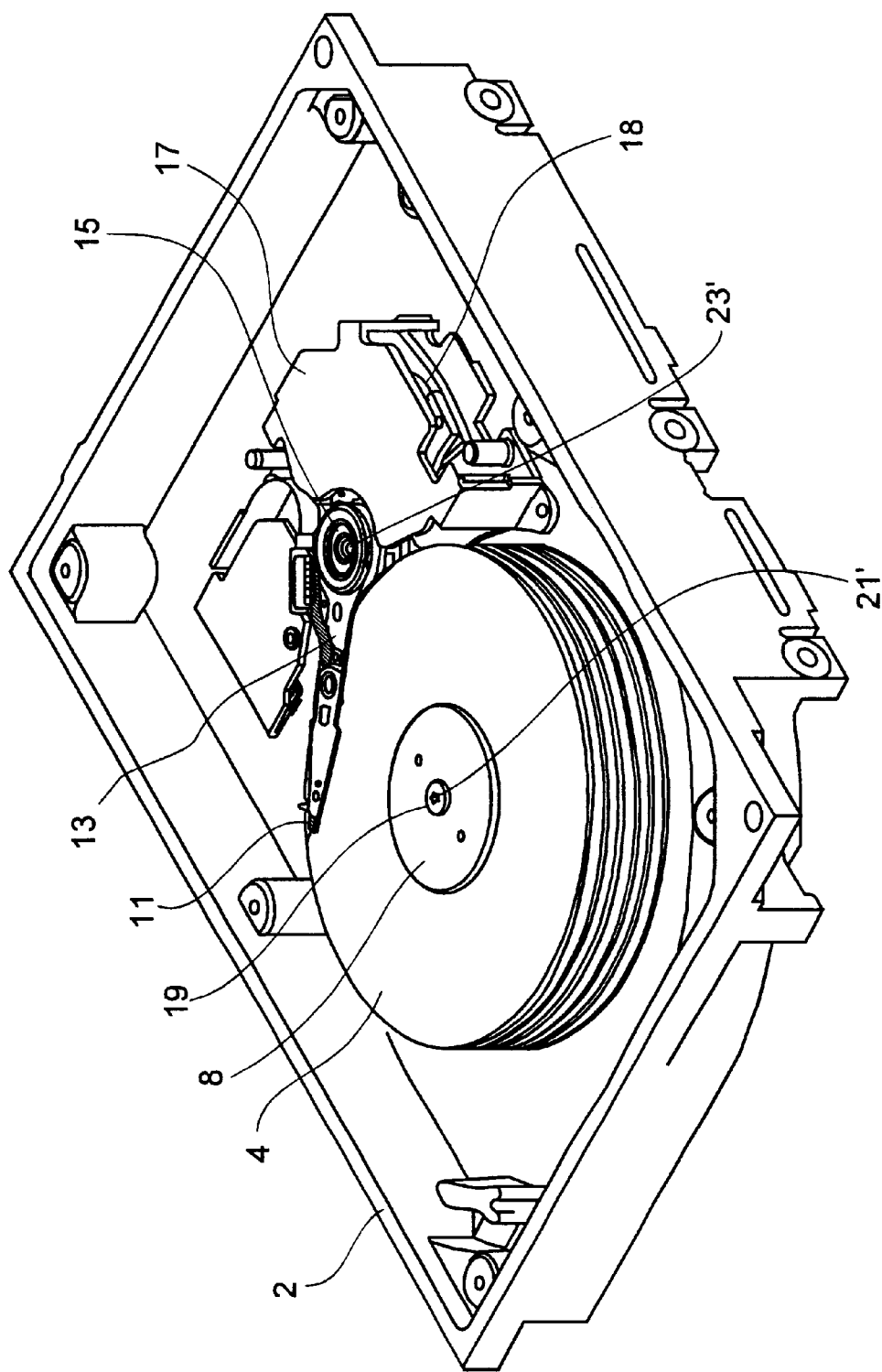
FIG. 26 is an oblique view of a magnetic disk drive of the fourth embodiment of present invention, which shows a different spacing in parts-arrangement from a normal magnetic disk drive.
Figure 27:
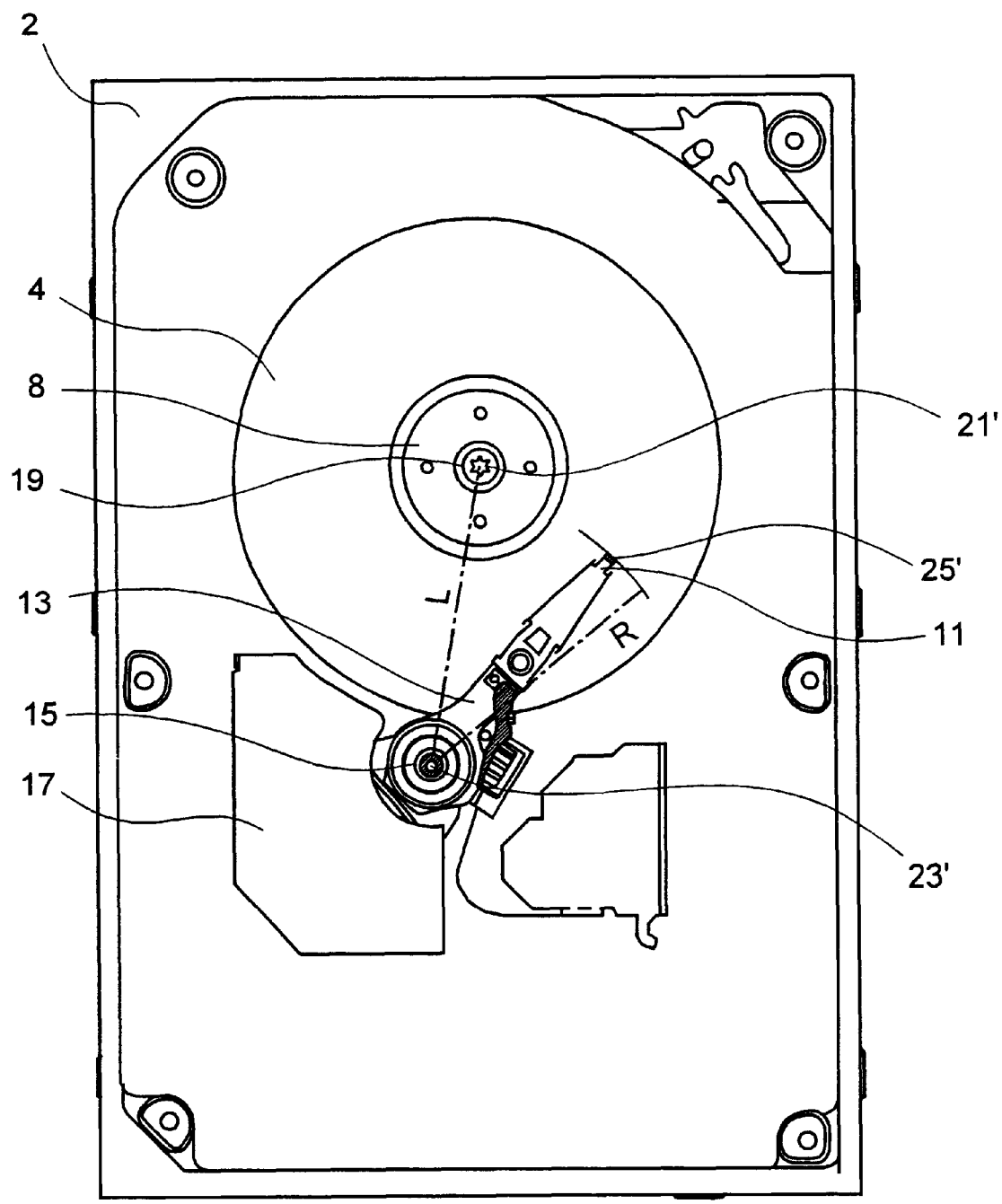
FIG. 27 shows a plan view of FIG. 26.

FIG. 26 and FIG. 27 show the tenth embodiment of present invention, 1.6 inches height "3.5 inches" magnetic disk drive.

A housing 2 is 3.5 inches form factor size which has a nominal height of 25.4 mm. The housing mounts magnetic disk media 4, a spindle motor (not shown) rotating the media in a predetermined speed, a swing type actuator 13 positioning a magnetic head 11 around a pivot bearing 15, and voice coil motor that is a driving means for the actuator.

There are two securing embodiments: one of a securing method of the spindle motor is with a screw or by a press fit to be secured at one edge of the spindle motor to the housing 2 that includes the spindle motor; the other of a securing method of the spindle motor is with a screw or by a press fit to be secured at one edge of the spindle motor to the housing 2 that includes the spindle motor and the other edge of the spindle motor is secured at a cover that hermetically closes the inner space of the housing 2. Axes for the spindle motor and the actuator may be secured by glues or adhesives to the housing. This securing method can bring more economical magnetic disk drives.

Features in this embodiment are: magnetic disk media 4 are made with Al (aluminum) or glass and they are "2.5 inches" in diameter. The six magnetic disk media 4, each of which has 0.635 mm in thickness, are mounted axially with interjacent disk spacers those are each 1.7 mm in thickness. Magnetic disk media 4 are secured stably by a disk cramp 8 and a screw 19. There is a space around the magnetic disk media 4. The space makes better a radiation characteristic in the housing 2, and the space gives freedom for selecting parts used in the housing.

A distance between a rotation center 21' of the magnetic disk 4 and a rotary center 23' of the magnetic head 11 is set up for 40 mm. The actuator 13 is secured via the pivot bearing 15 to the housing 2. The distance can be set at most 47.5 mm (=R below described+10 mm) for more economical structures of the magnetic disk drives, if existing actuator parts are used and if the torque of the voice coil motor is increased.

If '2.5 ' inches magnetic disk media of 0.8 mm in thickness are used in stead of '3.5 inches' magnetic disk media of same thickness, the weight decreases by about 54% per one medium. If '2.5' inches magnetic disk media of 0.635 mm in thickness are used in stead of '3.5 inches' magnetic disk media of 0.8 mm in thickness, the weight decreases by about 64% per one medium. Owing to a decrease in total weight of the media those are rotated by the spindle, there are effects on a high characteristic of a spin-up operation by the spindle motor, and also on a reduction of electric current (electric energy consumption) during an idle rotation.

FIG. 27 shows basic inner structure of present invention (in plan view).

The distance L between the rotation center 21' of the magnetic disk 4 and the rotary center 23' of the magnetic head 11 can be set shorter than that of prior magnetic disk drives because the smaller magnetic disk media 4 are used than usual. A gap 25' of the magnetic head 11 that records or reproduces information to or from the magnetic disk media 4, locates 37.5 mm (=R) from the rotary center 23'.

Thus in this embodiment, the parts can be freely arranged in the housing. If a performance (mainly storage capacity) be sacrificed, inexpensive parts can be adopted. So, there is a effect on fabrication of magnetic disk drives or magnetic disk drive systems, which put a high speed accessing function and an inexpensive device price into practice.

Because the present invention adopts using smaller magnetic disk media in form factor size than usual in a normal form factor size magnetic disk drive housing, or arranging fins (unlevel, washboard or jaggy portion) around the housing, prior problems those are generated in a high speed rotational technique can be resolved. And the magnetic disk drive or systems using thereof can be realized, which spends less electric power and gives less heat generation than prior magnetic disk drive, and which can indicate a high access performance with a high storage capacity.

When the magnetic disk drive of present invention is used for a disk array system or other magnetic disk drive systems, it can replace prior magnetic disk drive without adding a special cooling mechanism to the prior systems. There is an effect on easily realizing to perform a high speed operation and a high function, and to increase a storage capacity.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

We claim:

1. A magnetic disk drive, comprising:

magnetic disk media recording information;

fins arranged around said magnetic disk media;

a hub holding said magnetic disk media rotatably;

a spindle motor rotating said hub;

a magnetic head recording or reproducing information to or from one surface of said magnetic disk media;

an actuator holding and locating said magnetic head at a predetermined position on said magnetic disk media; and a housing of 3.5 inch form factor size, mounting said magnetic disk media, said hub, said magnetic head and said actuator;

wherein only one said spindle motor is housed in said housing, said magnetic disk media held on said hub are smaller in diameter than magnetic disk media for nominal 3.5 inch form factor magnetic disk drives, said spindle motor rotates at 10000 rpm to 15000 rpm and said fins are cast integrally with said housing; and wherein said fins are arranged along one of a depth direction and a width direction and have plural rows arranged in the thickness direction of the magnetic disk drive.

2. The magnetic disk drive according to claim 1, wherein others of said fins are arranged along one of said width direction exclusively or along said depth direction, in one row or two rows.

3. The magnetic disk drive according to claim 1, further comprising a fan making an air flow in a depth direction or a width direction of the magnetic disk drive.

4. The magnetic disk drive according to claim 1, wherein said housing has a hole to record a servo signal to said magnetic disk media.

\* \* \* \* \*